(12) United States Patent
Oguni et al.

(10) Patent No.: US 11,355,784 B2
(45) Date of Patent: Jun. 7, 2022

(54) POWER STORAGE DEVICE AND MANUFACTURING METHOD THEREOF

(71) Applicant: SEMICONDUCTOR ENERGY LABORATORY CO., LTD., Atsugi (JP)

(72) Inventors: Teppei Oguni, Kanagawa (JP); Junya Goto, Kanagawa (JP); Ai Nakagawa, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 146 days.

(21) Appl. No.: 16/662,083

(22) Filed: Oct. 24, 2019

(65) Prior Publication Data
US 2020/0058954 A1    Feb. 20, 2020

Related U.S. Application Data

(62) Division of application No. 15/586,354, filed on May 4, 2017, now Pat. No. 10,497,982.

(30) Foreign Application Priority Data

May 12, 2016  (JP) .............................. JP2016-095847
Jun. 3, 2016   (JP) .............................. JP2016-111877

(51) Int. Cl.
  *H01M 10/058*   (2010.01)
  *H01M 10/0525*  (2010.01)
  (Continued)

(52) U.S. Cl.
  CPC ..... *H01M 10/058* (2013.01); *H01M 10/0525* (2013.01); *H01M 10/0569* (2013.01);
  (Continued)

(58) Field of Classification Search
  CPC .. H01M 10/058; H01M 10/44; H01M 10/446; H01M 10/0569; H01M 10/0525
  See application file for complete search history.

(56) References Cited

U.S. PATENT DOCUMENTS

| | | |
|---|---|---|
| 6,465,125 B1 | 10/2002 | Takami et al. |
| 7,074,517 B2 | 7/2006 | Higashino |

(Continued)

FOREIGN PATENT DOCUMENTS

| | | | |
|---|---|---|---|
| EP | 2827434 A | 1/2015 | |
| EP | 3038202 A | 6/2016 | |

(Continued)

*Primary Examiner* — Karie O'Neill Apicella
(74) *Attorney, Agent, or Firm* — Nixon Peabody LLP; Jeffrey L. Costellia

(57) ABSTRACT

In initial charge and discharge, decomposition products or a gas is generated, degrading a battery. At least one of solvents (e.g., ethylene carbonate) used for an electrolytic solution is brought into contact with a positive electrode and a negative electrode and then charge is performed to some degree, and after that, a different solvent or electrolytic solution (e.g., ethyl methyl carbonate or vinylene carbonate) was added to adjust the electrolytic solution and then charge is performed. Through this process, stable coating films are formed in initial charge and discharge, which stably inhibits a side reaction between the electrolytic solution and an active material.

9 Claims, 26 Drawing Sheets

(51) Int. Cl.
  *H01M 10/0569* (2010.01)
  *H01M 10/44* (2006.01)
(52) U.S. Cl.
  CPC .... *H01M 10/446* (2013.01); *H01M 2300/004* (2013.01); *Y02T 10/70* (2013.01)

(56) References Cited

U.S. PATENT DOCUMENTS

| | | | |
|---|---|---|---|
| 10,263,293 B2 | 4/2019 | Yu et al. | |
| 2014/0373342 A1* | 12/2014 | Takenouchi | H01M 10/446 29/623.2 |
| 2015/0022957 A1 | 1/2015 | Hiroki et al. | |
| 2016/0254572 A1* | 9/2016 | Yu | H01M 10/058 429/126 |

FOREIGN PATENT DOCUMENTS

| | | |
|---|---|---|
| JP | 2000-149997 A | 5/2000 |
| JP | 2004-063352 A | 2/2004 |
| JP | 2006-294282 A | 10/2006 |
| JP | 2007-084469 A | 4/2007 |
| JP | 2009-110886 A | 5/2009 |
| JP | 2010-021104 A | 1/2010 |
| JP | 2015-038868 A | 2/2015 |
| JP | 2015-069702 A | 4/2015 |
| JP | 2016-539487 | 12/2016 |
| KR | 2015-0050220 A | 5/2015 |
| WO | WO-2013/136445 | 9/2013 |

* cited by examiner

FIG. 10A
FIG. 10B
FIG. 10C
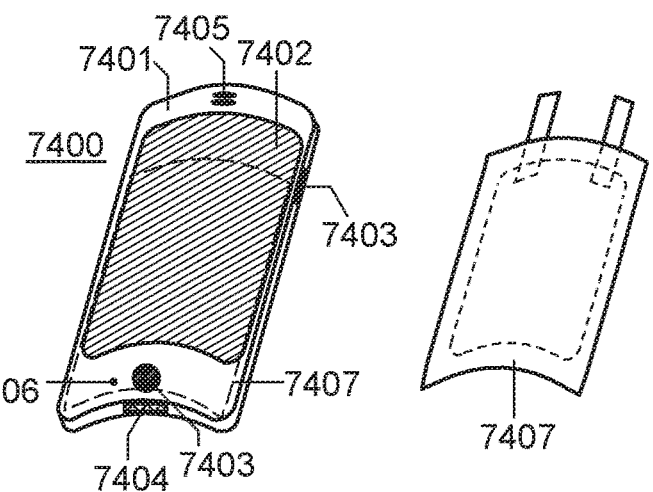
FIG. 10D
FIG. 10E
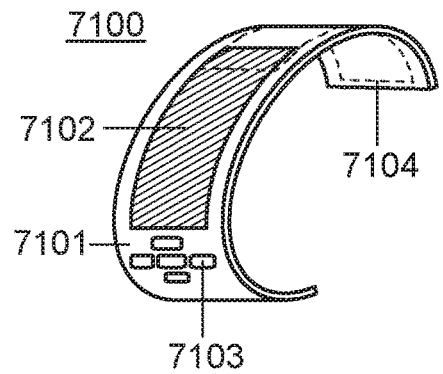
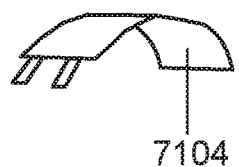
FIG. 10F
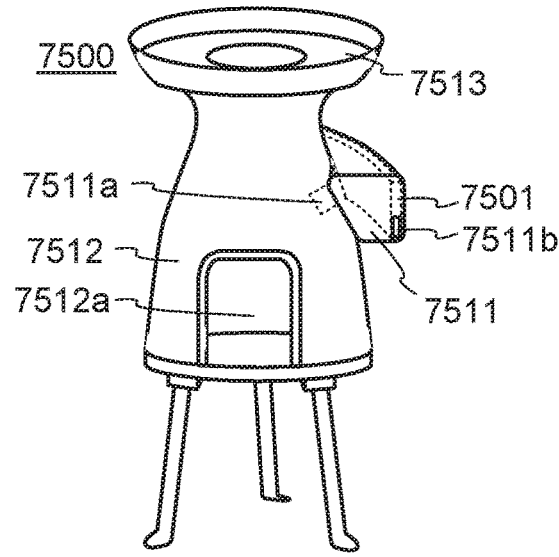

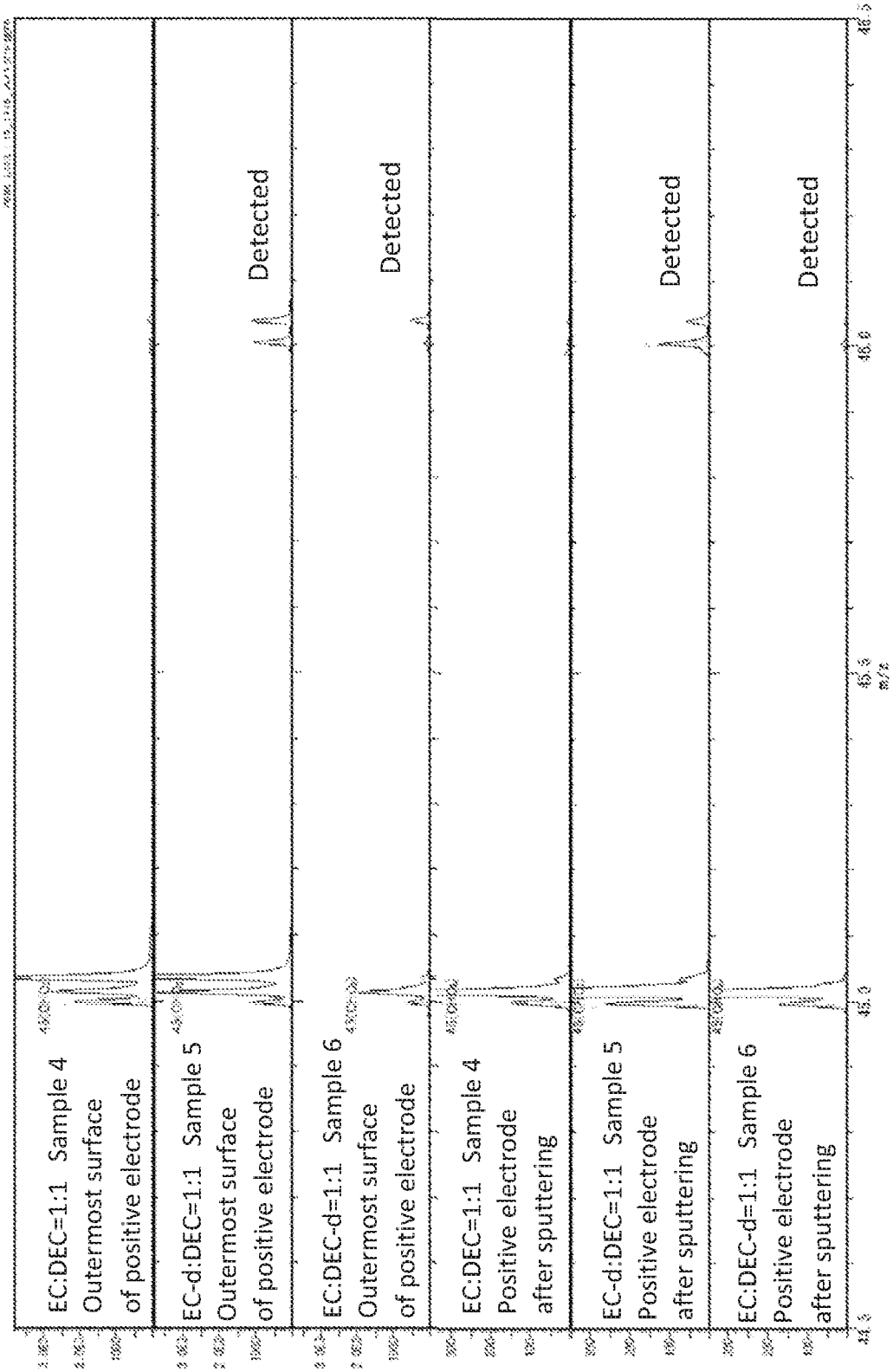

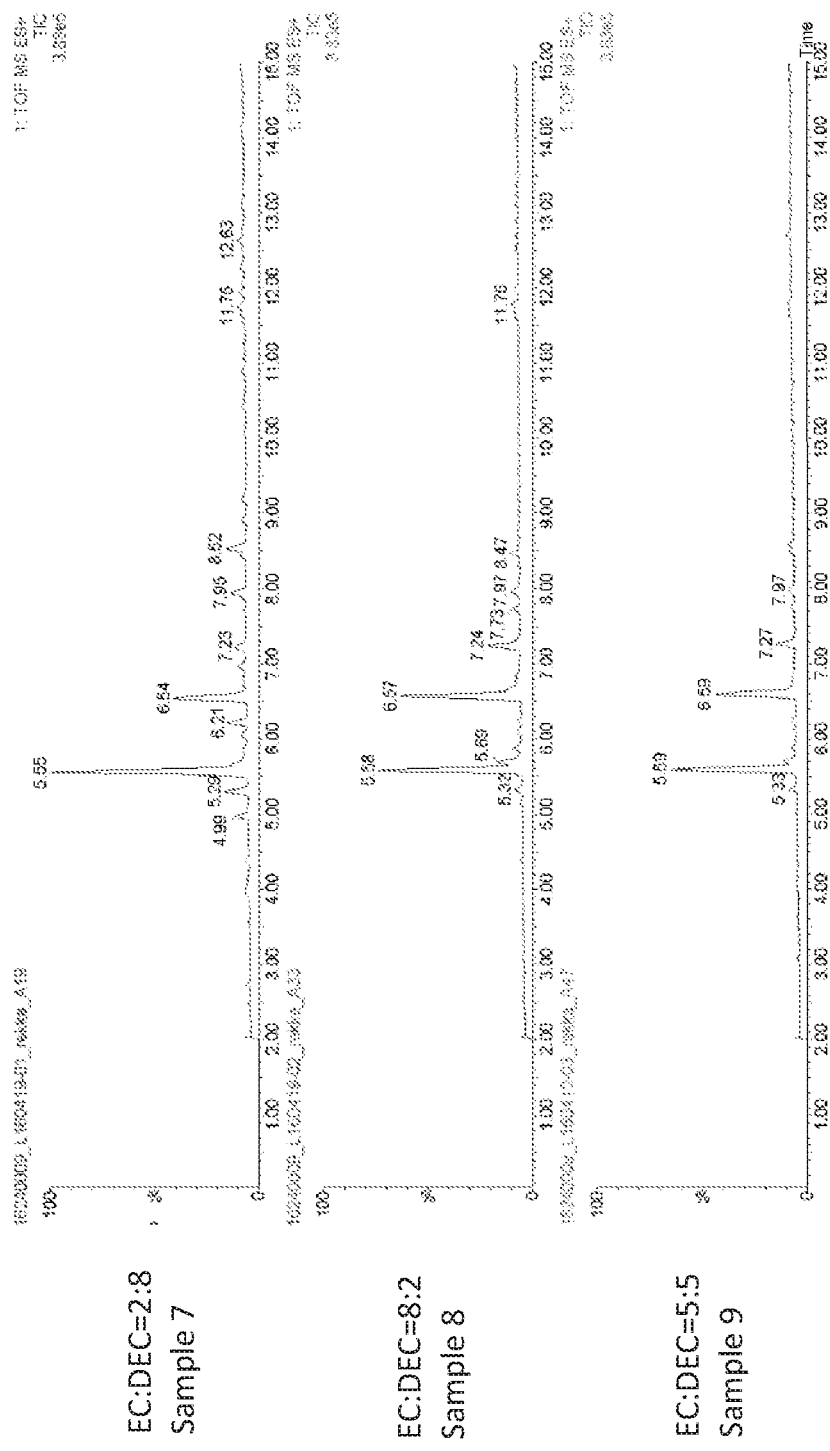

POWER STORAGE DEVICE AND MANUFACTURING METHOD THEREOF

BACKGROUND OF THE INVENTION

1. Field of the Invention

One embodiment of the present invention relates to an object, a method, or a manufacturing method. The present invention relates to a process, a machine, manufacture, or a composition of matter. One embodiment of the present invention relates to a semiconductor device, a display device, a light-emitting device, a power storage device, a lighting device, an electronic device, or a manufacturing method thereof. In particular, one embodiment of the present invention relates to an electronic device and its operating system.

Note that electronic devices in this specification generally mean devices including power storage devices, and electro-optical devices including power storage devices, information terminal devices including power storage devices, and the like are all electronic devices.

2. Description of the Related Art

Lithium-ion secondary battery as a type of power storage devices are used for a variety of applications, including a power source for a mobile phone, a fixed power source for a residential power storage system, and power storage equipment for a power generation facility, such as a solar cell. The performance required for lithium-ion secondary batteries includes increased energy density, improved cycle performance, safe operation under a variety of environments, and longer-term reliability.

A power storage device such as a lithium-ion secondary battery has the following problem. It is degraded due to repeated charge and discharge and the capacity thereof is gradually decreased. The voltage of the battery eventually becomes lower than voltages in a range where an electronic device including the battery can be used; thus, the battery does not function.

Power storage devices such as lithium-ion secondary batteries deteriorate owing to a variety of causes, for example, decomposition of electrolytic solutions, a change in the quality of positive electrodes, or a change in the quality of negative electrodes.

With an increase in the variety of uses for power storage devices, power storage devices with various exterior structures and various interior structures have been developed. For example, a button-type power storage device, which is small, is often provided in a small electronic device. A wound power storage device, which is fabricated by winding a positive electrode, a negative electrode, and a separator such that they are stacked, is excellent in terms of mass production. A laminated power storage device, which uses a film as its exterior body, can be thin. A bendable laminated power storage device is also known (Patent Document 1).

REFERENCE

Patent Document

[Patent Document] Japanese Published Patent Application No. 2015-38868

SUMMARY OF THE INVENTION

Various materials, roughly classified into positive electrode materials, negative electrode materials, materials for an electrolytic solution, and the like, are used for one battery. Thus, when the materials come in contact with each other, a chemical reaction occurs. Furthermore, in initial charge and discharge of a battery, the chemical reaction between materials might be accelerated or another chemical reaction (including electrolysis) might occur to generate decomposition products or a gas, accelerating battery deterioration.

Batteries are required to be capable of being charged and discharged over a wide temperature range from low to high temperature so that they can also be used in a severe environment. Thus, to widen the operation temperature range, three or more kinds of materials for an electrolytic solution, including an electrolyte, are preferably mixed to be used in consideration of a material for the electrolytic solution with which a battery can operate even at low temperature, a material for the electrolytic solution with which a battery can operate even at high temperature, the viscosity of the whole electrolytic solution that is most suitable for both low temperature and high temperature, and the like. However, an increase in the number of kinds of materials for an electrolytic solution increases the number of kinds of chemical reactions caused in initial charge and discharge of a battery and thus further complicates an internal state of the battery. This makes it difficult to determine the cause of deterioration.

Battery manufacturers decide a battery structure by selecting an optimum combination of materials after fabricating batteries with a variety of combinations of materials through much trial and error. Therefore, enormous time is expended for analysis of deterioration and selection of materials.

To find a cause of deterioration of a battery, the present inventors analyzed a changed portion of the deteriorated battery, first.

It was found by analysis of the deteriorated battery that coating films were formed on a surface of a positive electrode and a surface of a negative electrode. In addition, the quality of an electrolytic solution changed and a gas was generated. Components of the generated gas were analyzed and found to be methane, ethylene, ethane, and the like.

However, it was impossible to determine which material in the electrolytic solution changed its quality to cause film formation, a change in the quality of the electrolytic solution, and generation of the gas. For example, in the case of using carbon as a negative electrode material, a plurality of kinds of organic solvents for an electrolytic solution, and a lithium compound as a positive electrode material, although the coating film formed on the surface of the negative electrode was presumed to be composed of inorganic components (such as lithium carbonate and lithium fluoride) and organic components, it was difficult to judge how deterioration can be inhibited based on these results. That is, there is no method and procedure to be a guideline based on the analysis results of the deteriorated battery; thus, it has been difficult to design the most favorable battery with less deterioration.

Here, solvents for an electrolytic solution were selected and a power storage device sample was fabricated. In addition, another power storage device sample using deuterated products of the solvents for an electrolytic solution was fabricated. Then, analysis was performed to compare the two samples.

As a result of the analysis, decomposition products were identified by comparison between before and after charge and discharge of the power storage device using the deuterated products. Based on the findings, the present inventors have found the method described below.

In a conventional method to fabricate a power storage device that can be used at an environmental temperature ranging from −40° C. to 80° C. inclusive, many kinds of materials are mixed to form an electrolytic solution at an early stage and then the electrolytic solution was brought into contact with a positive electrode and a negative electrode. Disclosed in this specification is a method for manufacturing a power storage device in which at least one of solvents used for an electrolytic solution is brought into contact with a positive electrode and a negative electrode and then charge is performed to some degree, and after that, a different solvent or electrolytic solution was added to adjust the electrolytic solution and then charge is performed.

One of the materials for the electrolytic solution is ethylene carbonate (EC), which is a high dielectric constant solvent. The higher the dielectric constant of a solvent, the higher the capability of dissolving an electrolyte. Ethylene carbonate, which has a relative dielectric constant of 95.3 and a melting point of 36° C., is a cyclic carbonate that exhibits low viscosity at a temperature higher than the melting point. A high dielectric constant solvent refers to a compound with a relative dielectric constant of 20 or more at 25° C. A power storage device is fabricated using a mixed solution of ethylene carbonate contained at more than 50 vol %, preferably 70 vol % or more and a cyclic carbonate or a chain carbonate, as a solvent of the electrolytic solution that is brought into contact with a negative electrode (or a positive electrode) first. Specifically, ethyl methyl carbonate (EMC), which is a chain carbonate, diethyl carbonate (DEC), which is a chain carbonate, or a mixed solution thereof is used as a solvent of the electrolytic solution. Ethyl methyl carbonate (EMC) has a relative dielectric constant of 2.9, a melting point of −55° C., and a viscosity of 0.7 cPs at 21° C. Diethyl carbonate (DEC) has a relative dielectric constant of 2.8, a melting point of −43° C., and a viscosity of 0.8 cPs at 21° C. Ethyl methyl carbonate (EMC) and diethyl carbonate (DEC) are used to decrease the viscosity of the whole electrolytic solution. An increase in the content of these chain carbonates in the electrolytic solution tends to improve the low-temperature characteristics of the power storage device. In this specification, a "carbonate" refers to an organic compound containing at least one carbonic ester in its molecular structure and includes both a cyclic carbonate and a chain carbonate in its category. In addition, "chain" refers to "straight-chain" and "branched-chain".

Note that as an electrolyte in the electrolytic solution, lithium hexafluorophosphate (LiPF$_6$) or the like is used.

Two or more solvents including EC are used, charge is performed in two or more steps, a step of removing a gas from a region surrounded by an exterior body is performed more than once, and a sufficient chemical reaction between EC and each of the negative electrode and the positive electrode is mainly caused, whereby stable coating films are formed. This helps inhibition of deterioration of the power storage device.

Disclosed in this specification is a method for manufacturing a power storage device. In the manufacturing method, a positive electrode and a negative electrode are put in a container with an opening, a first electrolytic solution containing an electrolyte, a first solvent, a second solvent, and a third solvent is injected into the opening, the opening is sealed, charge is performed under a first condition, a first step of removing a gas from the container is performed, the third solvent is further mixed into the first electrolytic solution, charge is performed under a second condition, a second step of removing a gas from the container is performed, charge is performed under a third condition, discharge is performed, and then charge and discharge are repeated to obtain a power storage device containing a second electrolytic solution. The first electrolytic solution contains the first solvent at more than 50 vol %. The second electrolytic solution contains the first solvent at 40 vol % or less.

Disclosed in this specification is another method for manufacturing a power storage device. In the manufacturing method, a positive electrode and a negative electrode are put in a container with an opening, a first electrolytic solution containing an electrolyte, a first solvent, and a second solvent is injected into the opening, the opening is sealed, charge is performed under a first condition, a third solvent is mixed into the first electrolytic solution, a first step of removing a gas from the container is performed after the third solvent is mixed into the first electrolytic solution, charge is performed under a second condition, a keeping step is performed, a second step of removing a gas from the container is performed after the keeping step is performed, charge is performed under a third condition, discharge is performed, and then charge and discharge are repeated to obtain a power storage device containing a second electrolytic solution. The first electrolytic solution contains the first solvent at more than 70 vol %. The second electrolytic solution contains the first solvent at 60 vol % or less.

In the above method, the second electrolytic solution may contain the first solvent at more than 40 vol %.

In the above method, the electrolyte can be a lithium salt.

In the above method, the ratio of the first solvent and the second solvent can be determined by analyzing a power storage device that is fabricated in advance using a deuterated product of the first solvent and a deuterated product of the second solvent and subjected to initial charge and discharge so that a certain degree of side reaction is caused.

In the above method, charge under the first condition, the second condition, or the third condition can be performed with the container pressurized. In the pressurization, higher pressure can be applied to a region which overlaps with the negative electrode and the positive electrode than to the other region.

In the above method, the first solvent can be ethylene carbonate.

In the above method, the second solvent can be diethyl carbonate.

In the above method, the third solvent can be ethyl methyl carbonate.

Note that the charging method is also a feature of the above manufacturing method, and charge under the first condition, the second condition, or the third condition is performed with the container of the power storage device pressurized. When the power storage device is charged with its container pressurized, a gas contained in the electrolytic solution and a gas generated by decomposition of the electrolytic solution can be prevented from remaining between the positive electrode and the negative electrode and inhibiting charge and discharge, and formation of stable coating films is facilitated.

In the above method, charge is performed under the first condition, the first step of removing a gas from the region surrounded by the exterior body is performed, the third solvent is additionally injected, charge is performed under the second condition, the second step of removing a gas from the region surrounded by the exterior body is performed, and charge is performed under the third condition. It is important to perform charge under the first condition at a charging rate that is lower than that for the second condition with the first solvent content in the whole electrolytic solution set as high as 50 vol % or more, in order to slowly form coating films. Charge under the second condition is performed with the first solvent content in the whole electrolytic solution reduced to 40 vol % or less by addition of the third solvent. In addition, charge under the third condition is performed, whereby first charge is completed. First charge in this specification is completed at the stage where charge under the first condition, charge under the second condition, and charge under the third condition are completed, or at the time when a certain capacity value is reached. Note that the first charge is performed such that the power storage device is not fully charged, and the power storage device is fully charged by second charge after the first charge.

Another feature of the above manufacturing method is to determine the first solvent content by analyzing a power storage device using deuterated products. In the above manufacturing method, the ratio of the first solvent and the second solvent is determined by analyzing the power storage device that is fabricated in advance using a deuterated product of the first solvent and a deuterated product of the second solvent and subjected to initial charge and discharge so as to slightly deteriorate.

Note that initial charge and discharge refers to a process that includes first charge and in which several cycles of charge and discharge are performed at a charging rate of 0.01 C to 1 C inclusive.

At a certain timing in the first charge, specifically, after the first step of removing a gas from the region surrounded by the exterior body, ethyl methyl carbonate (EMC) and vinylene carbonate (VC) are added to the electrolytic solution to adjust the ethylene carbonate content in the whole electrolytic solution to be 40 vol % or less so that the power storage device can be used at a temperature ranging from −40° C. to 80° C. inclusive. Note that adding vinylene carbonate (VC), which contains an unsaturated bond, enhances cycle performance.

According to one embodiment of the present invention, stable coating films are formed in initial charge and discharge, which stably inhibits a side reaction between an electrolytic solution and an active material. As a result, the charge and discharge cycle performance of a power storage device is improved. Furthermore, a power storage device that can be used at a temperature ranging from −40° C. to 80° C. inclusive can be provided.

BRIEF DESCRIPTION OF THE DRAWINGS

FIGS. 10A to 10F each illustrate an electronic device of one embodiment of the present invention.

FIG. 23 shows ToF-SIMS analysis results of positive electrodes in Example 3.

FIG. 24 shows TICs of LC/MS/MS analyses of Samples 7 to 9 in Example 5.

DETAILED DESCRIPTION OF THE INVENTION

Hereinafter, embodiments and examples of the present invention will be described in detail with reference to the accompanying drawings. Note that the present invention is not limited to the description below, and it is easily understood by those skilled in the art that modes and details of the present invention can be modified in various ways. In addition, the present invention should not be construed as being limited to the description in the embodiments and examples given below.

Embodiment 1

Figure 1:
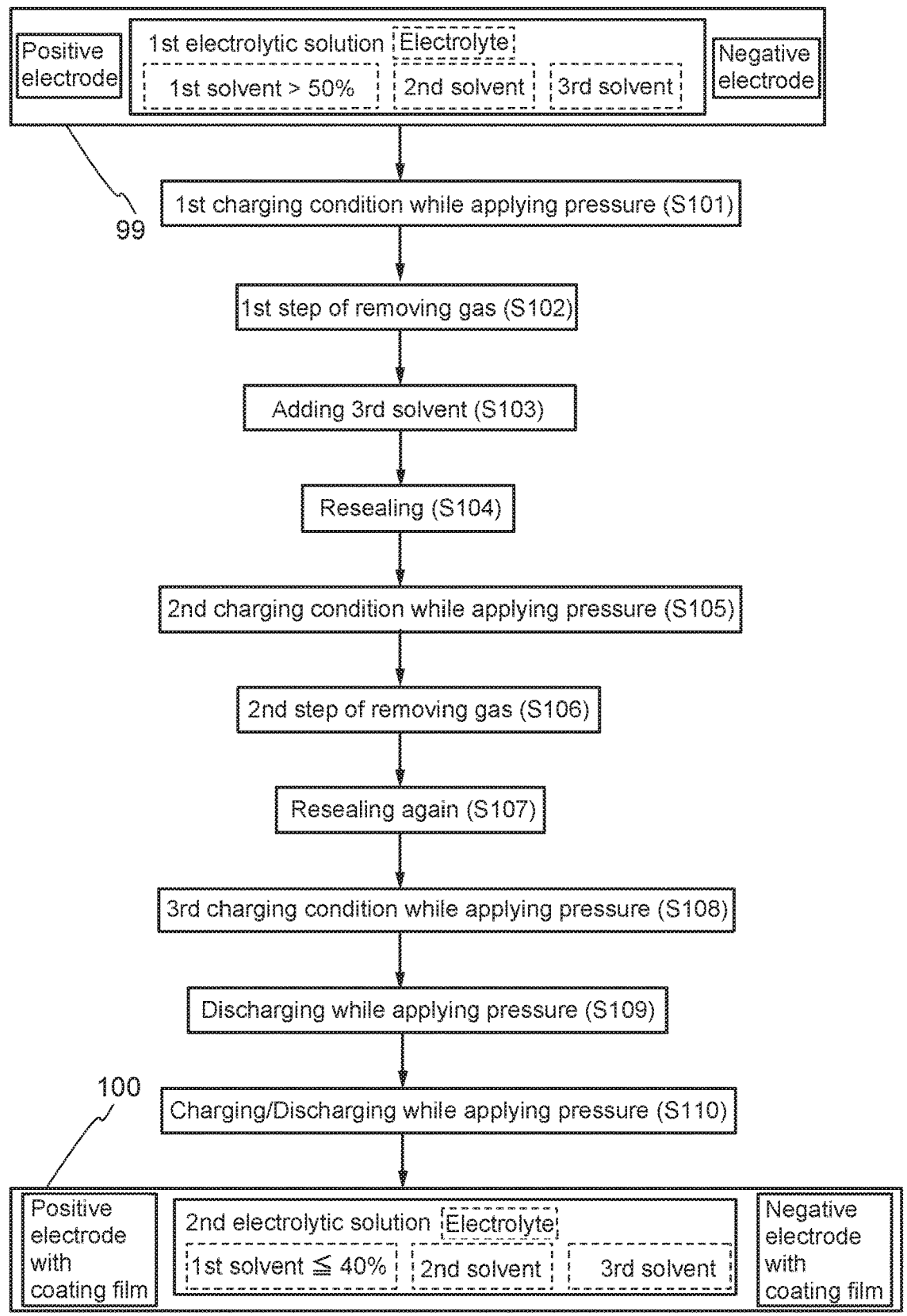
FIG. 1 is an example of a flow chart showing one embodiment of the present invention.

FIG. 1 is a flow chart showing an example of a fabrication process for a power storage device.

First, a first electrolytic solution is prepared. In this embodiment, an electrolyte (lithium salt) and three kinds of solvents are mixed to form the first electrolytic solution.

As the lithium salt, at least one of the following is used: $LiPF_6$, $LiN(FSO_2)_2$ (abbreviation: LiFSA), $LiClO_4$, $LiAsF_6$, LiOH, LiCl, $LiNO_3$, $Li_2SO_4$, $LiBF_4$, $LiCF_3SO_3$, $Li(CF_3SO_2)_2N$ (abbreviation: LiTFSA), $Li(C_2F_5SO_2)_2N$ (abbreviation: LiBETA), and the like.

As one of the three kinds of solvents (a first solvent), a cyclic carbonate, which is a high dielectric constant solvent, is used. Typically, ethylene carbonate is used. As the other two kinds of solvents (a second solvent and a third solvent), chain carbonates are used. Examples of a cyclic carbonate include ethylene carbonate and propylene carbonate. Examples of a chain carbonate include dimethyl carbonate, diethyl carbonate, and ethyl methyl carbonate. The three solvents are mixed with the lithium salt such that the first solvent (ethylene carbonate) content in the whole electrolytic solution is 50 vol % or more, preferably 70 vol % or more. In this manner, the first electrolytic solution is prepared.

Next, an exterior body serving as a container that holds the electrolytic solution is prepared. A structure using a film as the exterior body will be described below. In this embodiment, a film is processed to form a container, and the electrolytic solution, a positive electrode, a negative electrode, and the like are put in the container.

Figure 2A:
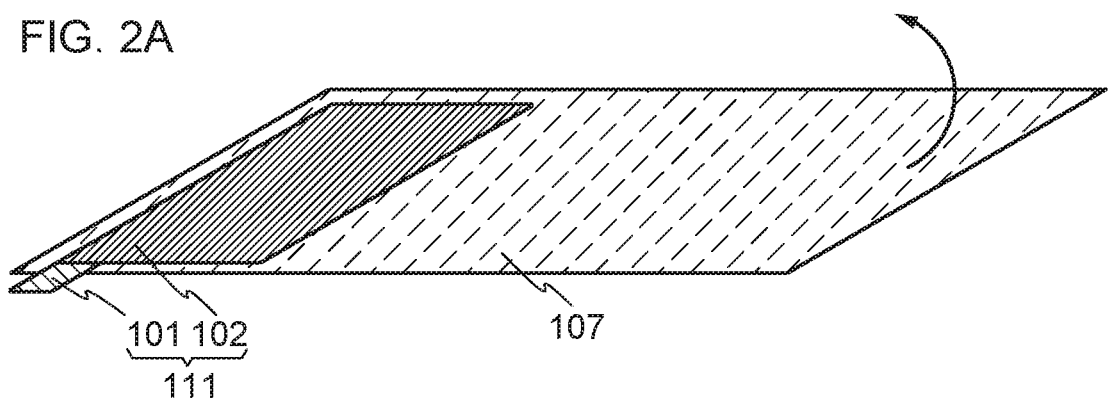
FIGS. 2A to 2D are perspective views illustrating one embodiment of the present invention.
Figure 2B:
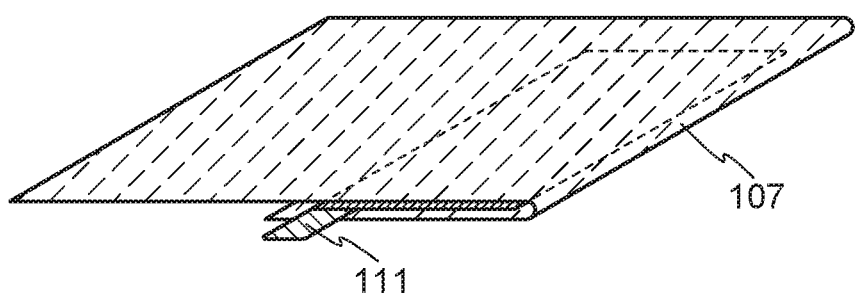

As illustrated in FIG. 2A, a positive electrode 111, where one surface of a positive electrode current collector 101 is provided with a positive electrode active material layer 102, is prepared and provided so as to overlap with a separator 107. Then, as illustrated in FIG. 2B, the separator 107 is folded such that a region of the separator 107 that has not overlapped with the positive electrode 111 overlaps with the positive electrode 111. Note that the placement of the separator 107 is not limited thereto.

Figure 2C:
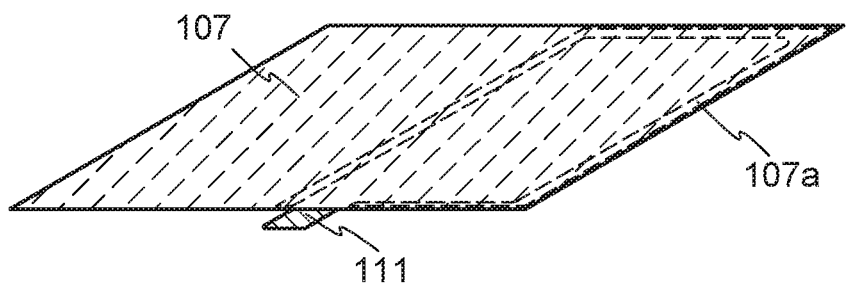

After that, facing portions of the separator 107 are bonded to each other at a region 107a around the positive electrode 111 such that the separator 107 covers the positive electrode 111, as illustrated in FIG. 2C. The bonding of the facing portions of the separator 107 can be performed with the use of an adhesive or the like, by ultrasonic welding, or by thermal fusing. In the case where a separator formed by stacking fibers is used, the facing portions of the separator may be bonded to each other by tangling the fibers with each other by mechanical pressure application. In the case where a separator made of a material whose portions can be bonded to each other by pressure application is used, portions of the separator can be bonded to each other by pressure application.

In this embodiment, polypropylene is used as the separator 107, and the facing portions of the separator 107 are bonded to each other by heating the region 107a around the positive electrode 111 (in other words, a region of the separator 107 that does not overlap with the positive electrode 111). In this manner, the positive electrode 111 can be covered with the separator 107.

The region 107a can be used not only in the case of bonding the separator 107 by heating but also in the case of bonding the separator 107 by any other method. The region 107a with a size suitable for a method for bonding the separator 107 is preferably provided, in which case the facing portions of the separator 107 can be easily bonded to each other.

Furthermore, the thickness of the region 107a after bonding is preferably smaller than that of the positive electrode 111.

Note that the facing portions of the separator 107 may be bonded to each other at a continuous bonding portion, discontinuous bonding portions, or dot-like bonding portions provided at regular intervals.

In this embodiment, an example of bonding at four sides of the region 107a is described: however, one embodiment of the present invention is not limited thereto. For example, bonding may be performed at only one side, only two sides, or only three sides of the region 107a.

In the case where bonding is performed at only one side, only two sides, or only three sides of the region 107a, bonding may be performed also at a region other than the bonded region in a later step. For example, bonding may be performed at the region after a negative electrode is covered with the separator. In the case where a power storage device is fabricated in which a plurality of positive electrodes and a plurality of negative electrodes are stacked, bonding may be performed at the region after the plurality of positive electrodes and the plurality of negative electrodes are covered with the separator so as to be stacked.

Figure 2D:
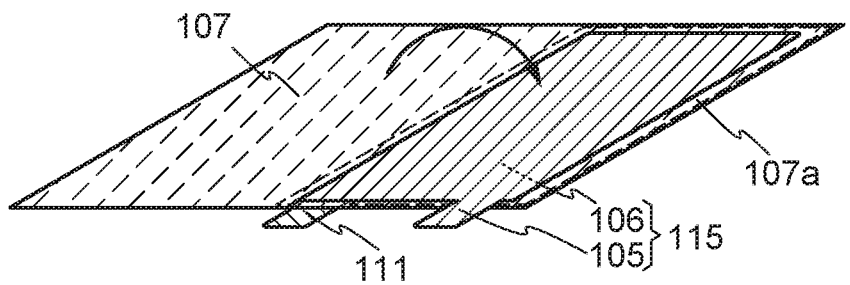
Figure 3A:
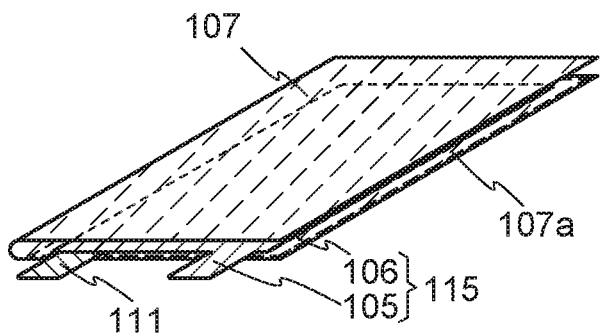
FIGS. 3A to 3D are perspective views illustrating one embodiment of the present invention.

Then, a negative electrode 115, where one surface of a negative electrode current collector 105 is provided with a negative electrode active material layer 106, is prepared and provided so as to overlap with the positive electrode 111 with the separator 107 therebetween, as illustrated in FIG. 2D. Then, the separator 107 is folded such that a region of the separator 107 that has not overlapped with the negative electrode 115 overlaps with the negative electrode 115, as illustrated in FIG. 3A.

Figure 3B:
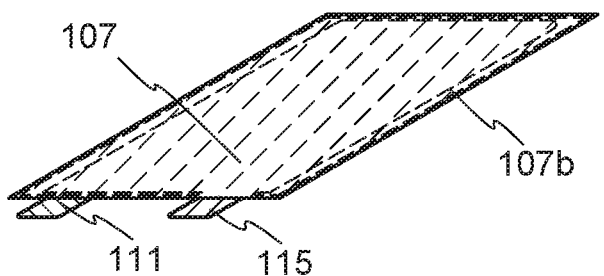

After that, as illustrated in FIG. 3B, facing portions of the separator 107 are bonded to each other at a region 107b around the negative electrode 115 (in other words, a region of the separator 107 that does not overlap with the negative electrode 115), whereby the negative electrode 115 is covered with the separator 107.

When the negative electrode 115 is provided so as to overlap with the positive electrode 111 with the separator 107 therebetween, the region 107b with an appropriate size is preferably provided, in which case the facing portions of the separator 107 can be easily bonded to each other. Furthermore, the region 107b with a size suitable for a method for bonding the separator 107 is preferably provided in the separator 107, in which case the facing portions of the separator 107 can be easily bonded to each other.

Furthermore, when the separator 107 is folded, the region 107b with an appropriate size is preferably provided, in which case the facing portions of the separator 107 can be easily bonded to each other.

Furthermore, the thickness of the region 107b after bonding is preferably smaller than that of the negative electrode 115.

Note that the region 107b may overlap with the region 107a. The total thickness of the region 107a and the region 107b is preferably smaller than the total thickness of the positive electrode 111 and the negative electrode 115.

In the aforementioned manner, the facing portions of the folded separator 107 are preferably bonded to each other to prevent relative misalignment of the positive electrode 111 and the negative electrode 115, in which case a short circuit due to contact between the positive electrode 111 and the negative electrode 115 can be reliably prevented. Furthermore, such a structure can reduce irregularities on the power storage device. For example, when the positive electrode 111 and the negative electrode 115 are fixed to each other with adhesive tape, the thickness of the adhesive tape causes irregularities on the electrodes. In contrast, when the facing portions of the separator 107 are bonded to each other without using adhesive tape, to prevent relative misalignment of the electrodes, irregularities can be prevented from being produced on the electrodes. Moreover, irregularities on the power storage device can be reduced.

Reducing irregularities on the electrodes and the power storage device facilitates even pressure application to the entire electrodes and the entire power storage device when the power storage device is charged by a charging and discharging method for the power storage device of one embodiment of the present invention. Furthermore, the distance between the positive electrode and the negative electrode can be easily kept constant. Thus, even when charging the power storage device decomposes the electrolytic solution contained in the power storage device, and a gas is generated, the distance between the positive electrode and the negative electrode can be prevented from becoming nonuniform.

Furthermore, components of the power storage device can be prevented from being damaged by pressure concentrated on projections of the power storage device. For example, using adhesive tape to fix the positive electrode 111 and the negative electrode 115 to each other increases the number of irregularities on the power storage device; thus, the active material layers in the positive electrode 111 and the negative electrode 115 might be separated at the projections on which pressure is concentrated. In contrast, when the facing portions of the separator 107 are bonded to each other by thermal pressure bonding instead of the use of adhesive tape so that misalignment of the positive electrode 111 and the negative electrode 115 is prevented, separation of the active material layers in the positive electrode 111 and the negative electrode 115 can be prevented.

Figure 3C:
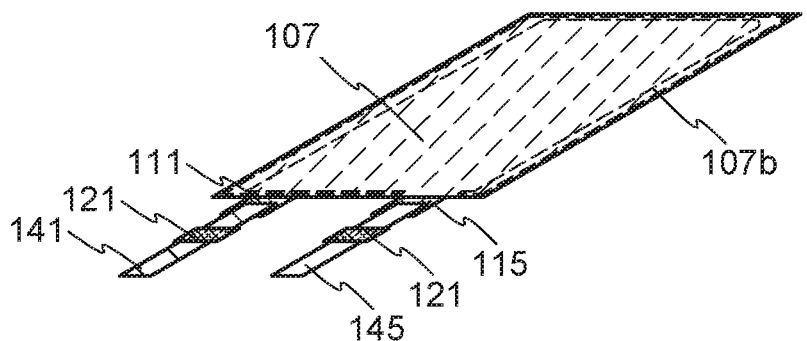

Next, as illustrated in FIG. 3C, a region of the positive electrode current collector in the positive electrode 111 that is not in contact with the positive electrode active material layer (hereinafter referred to as a positive electrode tab) is electrically connected to a positive electrode lead 141 provided with a sealing layer 121. In addition, a region of the negative electrode current collector in the negative electrode 115 that is not in contact with the negative electrode active material layer (hereinafter referred to as a negative electrode tab) is electrically connected to a negative electrode lead 145 provided with the sealing layer 121. Although there is no particular limitation on an electrically connecting method, ultrasonic irradiation may be performed while applying pressure (ultrasonic welding), for example.

Figure 3D:
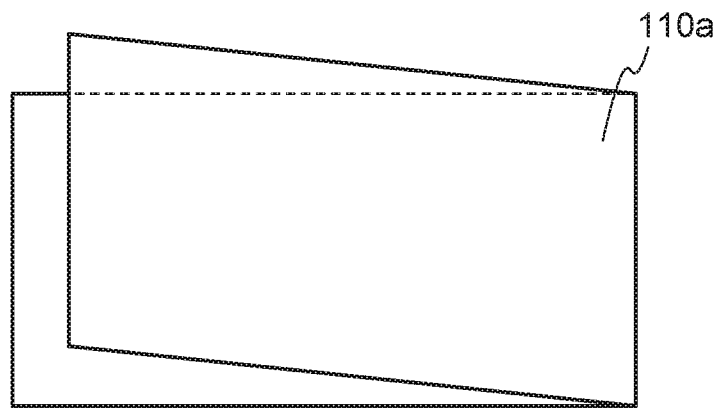

Next, a film 110a used for an exterior body is folded (FIG. 3D).

Figure 4A:
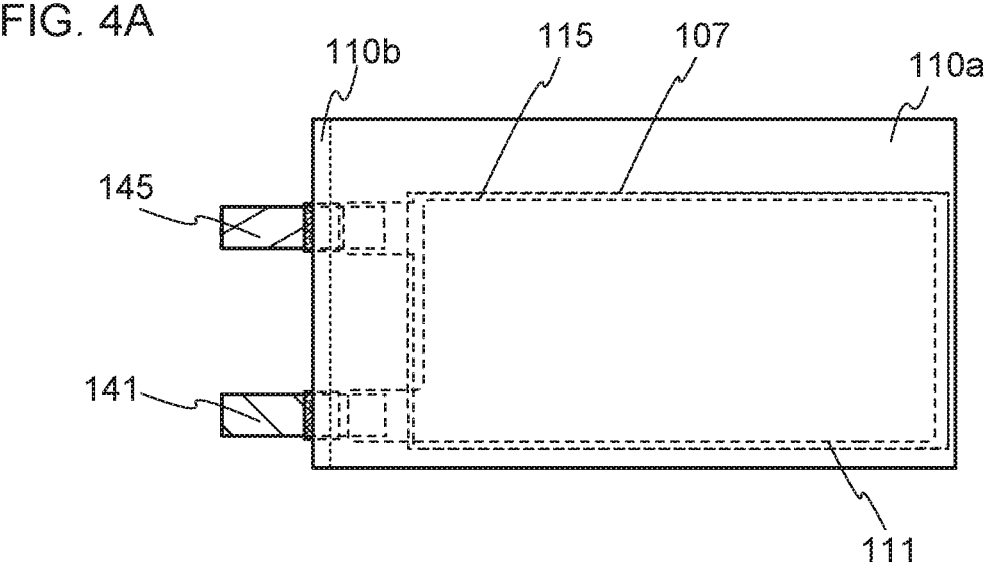
FIG. 4A to 4C are top views each illustrating one embodiment of the present invention.

Next, the positive electrodes 111, the positive electrode lead 141, the negative electrodes 115, the negative electrode lead 145, and the separator 107 are sandwiched by the folded film 110a. Then, facing portions at a side of the film 110a (a region 110b in FIG. 4A) are bonded to each other. The bonding can be performed by thermal welding.

Figure 4B:
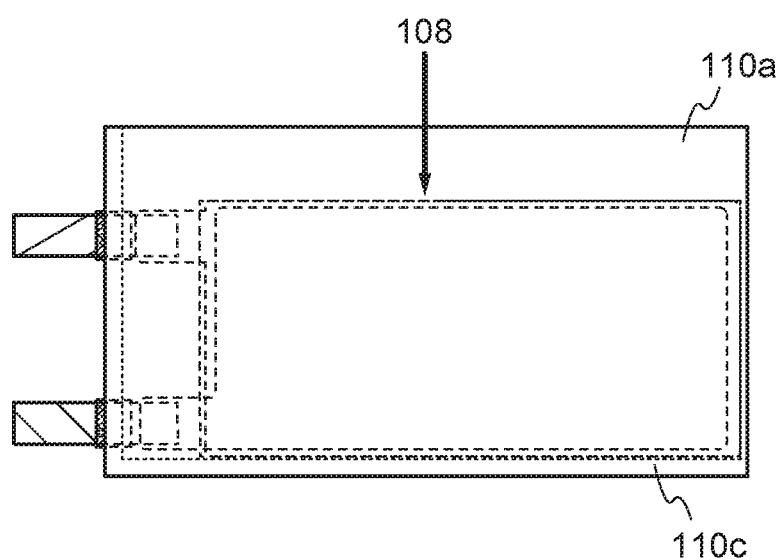

Next, the facing portions at another side of the film 110a (a region 110c in FIG. 4B) are bonded to each other. Then, an electrolytic solution 108 is injected to a region surrounded by the film 110a from a nonbonded portion of the film 110a (FIG. 4B).

Figure 4C:
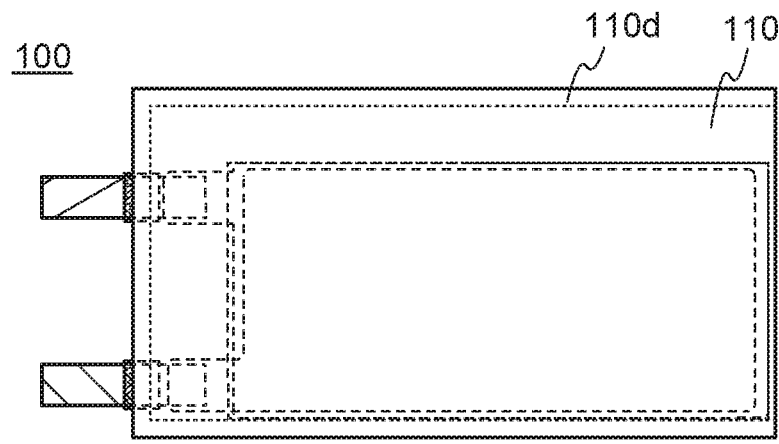

Next, the facing portions at the other side (a region 110d in FIG. 4C) of the film 110a are bonded by heat and pressure application under vacuum, so that the film 110a becomes the sealed exterior body 110 (FIG. 4C). This process is performed in an environment from which oxygen and water are eliminated, for example, in a glove box. The evacuation may be performed with a vacuum sealer, a liquid pouring sealer, or the like. Heat and pressure application can be performed by setting the exterior body 110 between two heatable bars included in the sealer. Alternatively, bonding and sealing of the exterior body 110 can be performed by heating it with laser light or the like. The conditions can be set as follows, for example: the degree of vacuum is 50 kPa to 70 kPa inclusive, the heating temperature is 150° C. to 190° C. inclusive, the pressure is 0.5 MPa to 1.5 MPa inclusive, and the time is 2 seconds to 3 seconds inclusive. At this time, pressure may be applied to the positive electrode and the negative electrode through the film 110a. The pressure application enables removal of bubbles that have entered between the positive electrode and the negative electrode when the electrolytic solution is injected.

At this stage, a cell 99 that contains the first electrolytic solution and is not yet subjected to an initial charge and discharge process in FIG. 1 can be fabricated. At this stage, the first solvent content in the first electrolytic solution exceeds 50 vol % as shown in FIG. 1.

The cell 99 is subjected to an initial charge and discharge process and the like in S101 to S110 described below, whereby a cell 100 is obtained. Note that initial charge and discharge refers to a process that includes first charge and in which several cycles of charge and discharge are performed at a charging rate of 0.01 C to 1 C inclusive. Specifically, an external power source is connected between the positive electrode and the negative electrode that are included in the power storage device, and charge is performed.

In the initial charge and discharge process, the cell 99 is first charged under a first condition (S101), specifically, at a rate of less than 0.1 C. When the first condition is employed and the first solvent content in the electrolytic solution exceeds 50 vol %, a chain reaction of the decomposition of the first solvent on the positive electrode and the negative electrode can continue for a long time, resulting in formation of favorable coating films derived from the first solvent. At the same time, generation of a decomposition product with a low molecular weight can be inhibited. Furthermore, cycle performance can be enhanced.

Note that in this specification and the like, a decomposition product refers to a substance generated by decomposition of materials included in the electrolytic solution, the positive electrode, and the negative electrode or a substance generated by chemical bonding between the decomposed materials and another molecule.

Furthermore, the charge under the first condition is performed with the cell 99 pressurized. Pressurizing the cell can reduce the distance between the positive electrode and the negative electrode included in the cell. When the high dielectric constant solvent content in the electrolytic solution is higher than 50 vol %, the viscosity of the electrolytic solution is high and thus lithium-ion transfer between the electrodes might be difficult; however, a reduction in the distance between the positive electrode and the negative electrode can lower the resistance of the cell.

Figure 5A:
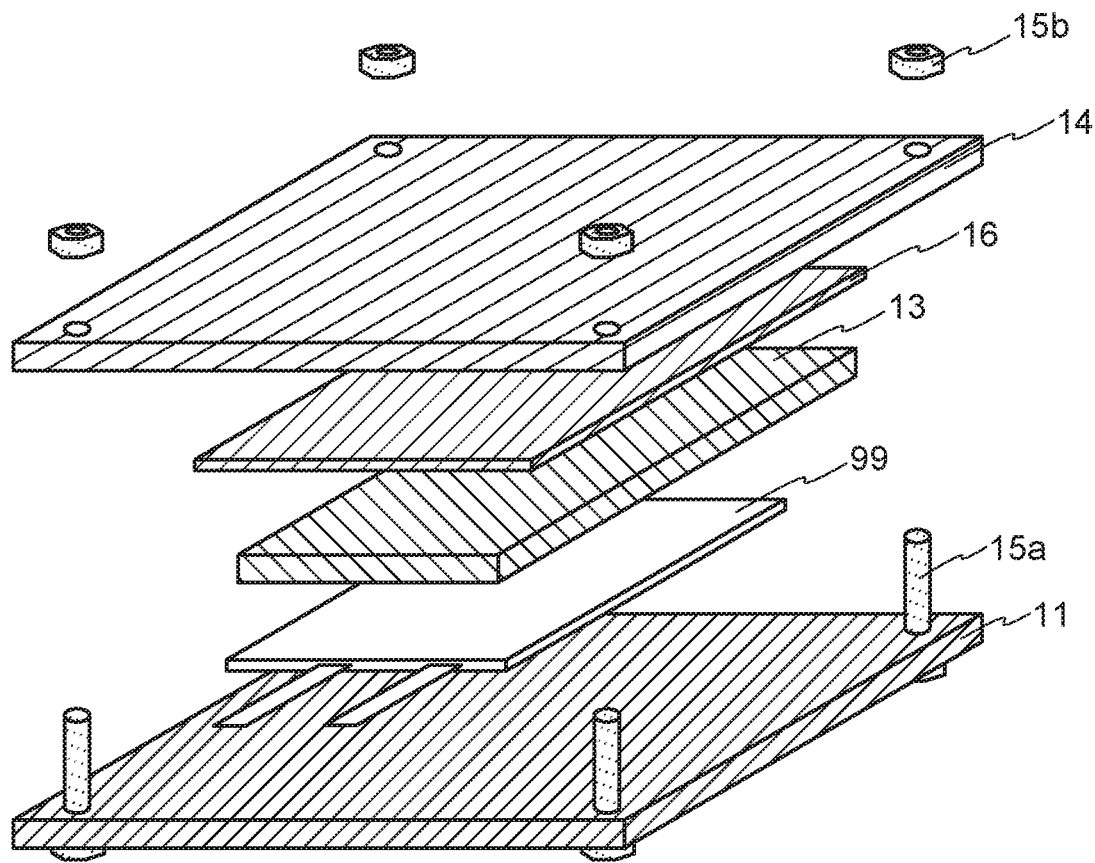
FIGS. 5A and 5B illustrate a pressurizing instrument of a power storage device.
Figure 5B:
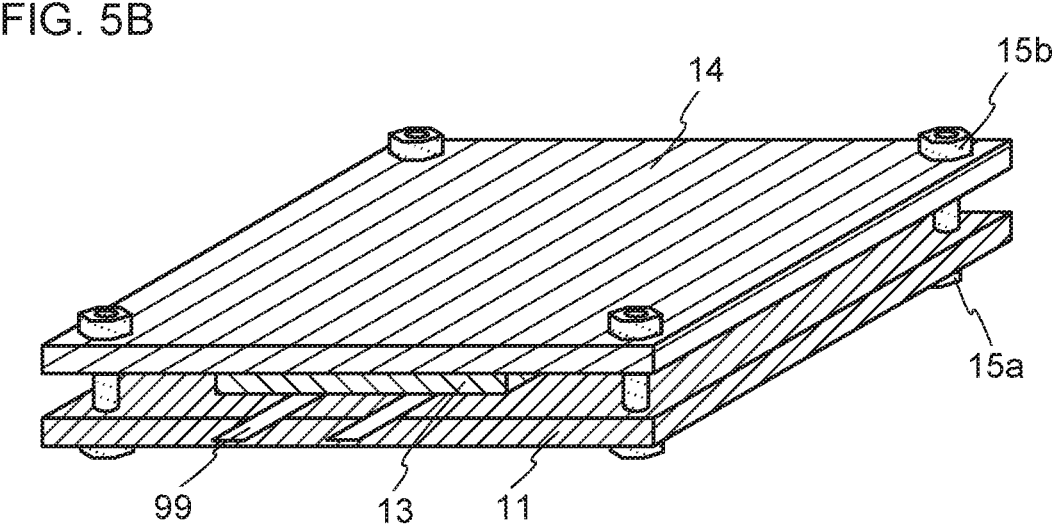

FIGS. 5A and 5B are schematic diagrams illustrating a pressurizing instrument used in this embodiment. The pressurizing instrument includes a flat-plate supporting component 11, a flat-plate cushioning 13, a flat-plate supporting component 14, a fixing instrument 15a, a fixing instrument 15b, and a flat-plate supporting component 16. The supporting component 11, the cell 99 to be subjected to the initial charge and discharge process, the cushioning 13, the supporting component 16, the supporting component 14 are stacked in this order as illustrated in FIG. 5A and the distance between the supporting component 11 and the supporting component 14 is fixed using the fixing instrument 15a and the fixing instrument 15b as illustrated in FIG. 5B, whereby pressure can be applied to the cell 99.

In the case where the cell 99 and the flat-plate cushioning 13 are positioned such that the cushioning 13 covers the positive electrode and the negative electrode included in the cell 99 and does not cover part of the exterior body, pressure is not easily applied to the part of the exterior body even when the pressurizing instrument is constructed as illustrated in FIG. 5B. In other words, a region overlapping with the positive electrode and the negative electrode included in the cell 99 is sufficiently pressurized, whereas a region not overlapping with the positive electrode and the negative electrode included in the cell 99 is more weakly pressurized than the region overlapping with the positive electrode and the negative electrode. This allows a gas generated because of decomposition of the electrolytic solution by charge and discharge of the cell 99 to easily flow to the region not overlapping with the positive electrode and the negative electrode. Thus, accumulation of the gas in the region overlapping with the positive electrode and the negative electrode can be prevented and variation in the distance between the positive electrode and the negative electrode can be suppressed.

After the charge under the first condition, a first step of removing a gas from a region surrounded by the exterior body is performed (S102). In the first step of removing the gas from the region surrounded by the exterior body, the exterior body 110 is partly cut to form an opening. The first step of removing the gas from the region surrounded by the exterior body is also preferably performed while pressure is applied. Furthermore, it is preferably performed under reduced pressure, in which case a gas is more easily removed.

Next, the third solvent is added to the first electrolytic solution to adjust the first solvent content in the whole electrolytic solution to be 40 vol % or less (S103). After that, the opening from which the third solvent is injected is sealed (S104). The sealing can be performed as in the fabrication process for the cell 99, for the sealing, thermal pressure bonding may be performed with the exterior body 110 sandwiched between two bars having a heating function included in a sealer or bonding may be performed by heating the exterior body 110 with laser light or the like, for example. Reducing the first solvent content in the whole electrolytic solution to 40 vol % or less can reduce the viscosity of the whole electrolytic solution and ensures the low-temperature characteristics.

In adding the third solvent, VC or the like may also be added. Besides VC, vinyl ethylene carbonate, fluoroethylene carbonate, or the like may be added. The use of VC enables formation of stable coating films on the positive electrode and the negative electrode.

Next, charge is performed under a second condition while pressure is applied using the pressurizing instrument illustrated in FIGS. 5A and 5B (S105). Specifically, charge is performed at a rate of 0.1 C or more and less than 1 C.

After the charge under the second condition, a second step of removing a gas from the region surrounded by the exterior body is performed (S106). In the second step of removing the gas from the region surrounded by the exterior body, the exterior body 110 is partly cut to form an opening. The second step of removing the gas from the region surrounded by the exterior body is also preferably performed while pressure is applied. Furthermore, it is preferably performed under reduced pressure, in which case a gas is more easily removed.

The opening from which the second step of removing the gas from the region surrounded by the exterior body is performed is sealed (S107).

Next, charge is performed under a third condition while pressure is applied using the pressurizing instrument illustrated in FIGS. 5A and 5B (S108). Specifically, charge is performed at a rate of 0.1 C or more and less than 1 C. The charging rate of the third condition may be the same as that of the second condition. At this stage, first charge ends.

Next, discharge is performed while pressure is applied using the pressurizing instrument illustrated in FIGS. 5A and 5B (S109).

Subsequently, full charge is performed while pressure is applied using the pressurizing instrument in FIGS. 5A and 5B and then discharge is performed (S110). Full charge is performed two more times and then discharge is performed, so that the cell 100 containing a second electrolytic solution can be completed. The first solvent content in the second electrolytic solution is 40 vol % or less. Through the above process, the cell 100 including the positive electrode with a coating film and the negative electrode with a coating film is completed. The cell 100 containing the second electrolytic solution has excellent cycle performance and can be used at an environmental temperature ranging from −40° C. to 80° C. inclusive.

Note that in one embodiment of the present invention, bonding the facing portions of the separator to each other is not necessarily performed to cover the positive electrode 111 and the negative electrode 115 with the separator 107. The separator 107 may alternatively be a strip-shaped separator positioned between the positive electrode 111 and the negative electrode 115 as long as the separator 107 can prevent contact between the positive electrode 111 and the negative electrode 115 in the cell 100.

Furthermore, in one embodiment of the present invention, the number of each of the positive electrode 111, the negative electrode 115, and the separator 107 is not necessarily one. The number of each of the positive electrode 111, the negative electrode 115, and the separator 107 used in fabricating a power storage device may be more than one.

Furthermore, in one embodiment of the present invention, the positive electrode 111 in which one surface of the positive electrode current collector 101 is provided with the positive electrode active material layer 102 and the negative electrode 115 in which one surface of the negative electrode current collector 105 is provided with the negative electrode active material layer 106 are not necessarily used. A positive electrode in which opposite surfaces of a positive electrode current collector are provided with positive electrode active material layers may be used. A negative electrode in which opposite surfaces of a negative electrode current collector are provided with negative electrode active material layers may be used. Alternatively, a positive electrode in which opposite surfaces of a positive electrode current collector are provided with positive electrode active material layers and a positive electrode in which one surface of a positive electrode current collector is provided with a positive electrode active material layer may be used in combination. A negative electrode in which opposite surfaces of a negative electrode current collector are provided with negative electrode active material layers and a negative electrode in which one surface of a negative electrode current collector is provided with a negative electrode active material layer may be used in combination.

Embodiment 2

Figure 6:
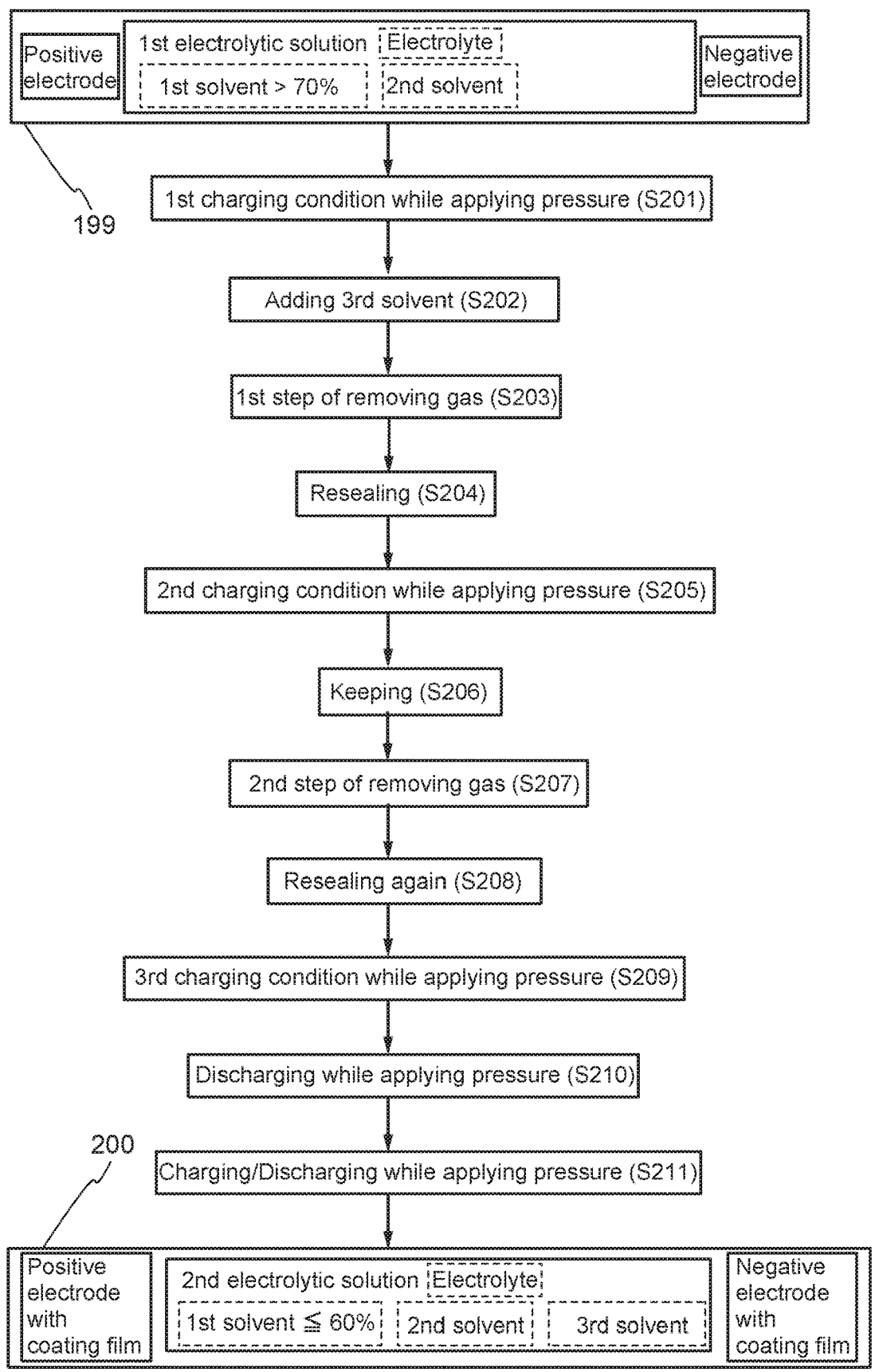
FIG. 6 is an example of a flow chart showing one embodiment of the present invention.

FIG. 6 is a flow chart showing an example of a fabrication process for a power storage device that is different from the example in FIG. 1.

First, a first electrolytic solution is prepared. Although three kinds of solvents are mixed to form the first electrolytic solution in the fabrication procedure in Embodiment 1, two kinds of solvents are mixed to form the first electrolytic solution in this embodiment.

As a lithium salt, any of the lithium salts described in Embodiment 1 can be used.

As one of the two kinds of solvents (a first solvent), a cyclic carbonate, which is a high dielectric constant solvent, is used. Examples of a cyclic carbonate include ethylene carbonate (EC) and propylene carbonate. EC has a relative dielectric constant of 95.3 and a melting point of 36° C. and exhibits low viscosity at a temperature higher than the melting point. In this embodiment, EC is used as the first solvent.

As a second solvent, a chain carbonate is used. Examples of a chain carbonate include dimethyl carbonate (DMC), diethyl carbonate (DEC), and ethyl methyl carbonate (EMC). In this embodiment, DEC is used as the second solvent. Adding DEC can reduce the viscosity of the whole electrolytic solution. An increase in the content of a chain carbonate, such as DEC, in the second electrolytic solution tends to improve the low-temperature characteristics of the power storage device.

The first solvent, the second solvent, and the lithium salt are mixed such that the first solvent (EC) content in the solvents contained in the first electrolytic solution exceeds 70 vol %, whereby the first electrolytic solution is prepared.

Although two kinds of solvents are mixed to form the first electrolytic solution in this embodiment, one embodiment of the present invention is not limited thereto. Only the first solvent may be used to form the first electrolytic solution, or three or more kinds of solvents may be mixed to form the first electrolytic solution.

In the case where three or more kinds of solvents are mixed to form the first electrolytic solution, a solvent that enables formation of stable coating films on the positive electrode and the negative electrode is preferably added as well as the above solvents. For example, VC, vinyl ethylene carbonate, fluoroethylene carbonate, or the like may be added. In particular, adding a solvent having a carbon-carbon double bond and high reactivity, such as VC, allows more efficient formation of the coating films.

Description in Embodiment 1 can be referred to for the exterior body, which serves as a container for holding the electrolytic solution, the positive electrode, the negative electrode, the method for pressure application, and the like, other than the proportions of solvents in the electrolytic solution.

When the above condition is employed for the proportions of solvents in the electrolytic solution and an exterior body, a positive electrode, and a negative electrode that are similar to those in Embodiment 1 are used, a cell 199 that contains the first electrolytic solution and is not yet subjected to an initial charge and discharge process in FIG. 6 can be fabricated. At this stage, the first solvent content in the first electrolytic solution exceeds 70 vol % as shown in FIG. 6.

Steps S201 to S211 described below are performed on the cell 199, whereby a cell 200 is obtained. In the initial charge and discharge process, the cell 199 is first charged under the first condition (S201). The step S201 is for forming stable coating films derived from the first solvent on surfaces of the positive electrode and the negative electrode; thus, charge is preferably performed at a low rate so that enough time is taken to form the coating films. Specifically, the charge is preferably performed at a rate of less than 0.1 C.

If the amount of charge in S201 is excessively large, however, the thicknesses of the coating films become too large, which might worsen the charge and discharge characteristics. For this reason, the amount of charge is preferably 10 mAh/g to 30 mAh/g inclusive, particularly preferably 15 mAh/g to 25 mAh/g inclusive. Note that the amount of charge is that per gram of a positive electrode active material.

When the first solvent content in the first electrolytic solution is set to higher than 70 vol % and charge is performed under the first condition, a chain reaction of the decomposition of the first solvent on the surfaces of the positive electrode and the negative electrode can continue for a long time, resulting in formation of stable coating films. At the same time, generation of a decomposition product with a low molecular weight that dissolves in the electrolytic solution, as a side reaction, can be inhibited. Furthermore, cycle performance can be enhanced.

Note that in this specification and the like, a decomposition product refers to a substance generated by decomposition of materials included in the electrolytic solution, the positive electrode, and the negative electrode or a substance generated by a chemical reaction between the decomposed materials and another molecule.

Furthermore, the charge under the first condition is preferably performed with the cell 199 pressurized. Pressurizing the cell can reduce the distance between the positive electrode and the negative electrode included in the cell. When the high dielectric constant solvent content in the first electrolytic solution is higher than 70 vol %, the viscosity of the first electrolytic solution is high and thus lithium-ion transfer between the electrodes might be difficult; however, a reduction in the distance between the positive electrode and the negative electrode can lower the resistance of the cell.

Pressure application can be performed using the pressurizing instrument illustrated in FIGS. 5A and 5B as in Embodiment 1, for example.

Next, the exterior body 110 is partly cut to form an opening.

After the charge under the first condition, a third solvent is mixed into the first electrolytic solution (S202). As the third solvent, a solvent that contains a chain carbonate and has a lower viscosity than the first solvent is used. As the chain carbonate, any of the chain carbonates that can be used as the second solvent can be used. In this embodiment, EMC is used as the third solvent.

Although an example is described in which one kind of solvent is mixed into the first electrolytic solution in this embodiment, one embodiment of the present invention is not limited thereto. Two or more kinds of solvents may be mixed into the first electrolytic solution. In that case, other chain carbonates may be added or any of VC, vinyl ethylene carbonate, fluoroethylene carbonate, and the like may be added. In particular, VC is preferably added, in which case more stable coating films can be formed on the positive electrode and the negative electrode.

Next, a step of removing a gas from a region surrounded by the exterior body is performed (S203). The step of removing the gas from the region surrounded by the exterior body is also preferably performed while pressure is applied. Furthermore, it is preferably performed under reduced pressure, in which case a gas is more easily removed.

Removing the gas contained in the electrolytic solution and the gas generated by the decomposition of the electrolytic solution can prevent charge and discharge from being inhibited by the gases remaining between the positive electrode and the negative electrode.

Note that the order of the steps S202 and S203 may be reversed.

After that, the opening is sealed (S204). The sealing can be performed as in the fabrication process for the cell 199; for the sealing, thermal pressure bonding may be performed with the exterior body 110 sandwiched between two bars having a heating function included in a sealer or bonding may be performed by heating the exterior body 110 with laser light or the like, for example.

Next, charge is performed under a second condition while pressure is applied using the pressurizing instrument illustrated in FIGS. 5A and 5B (S205). Specifically, charge is performed at a rate of 0.1 C or more and less than 1 C. The charge in S205 is preferably performed until the phase transition of the positive electrode active material occurs. In the case where a keeping step (S206) described later is provided after the phase transition of the positive electrode active material occurs, the irreversible capacity of the positive electrode active material might increase. Lithium cobalt oxide changes its phase from a hexagonal crystal to a monoclinic crystal after releasing approximately half the amount of lithium therein. Thus, when lithium cobalt oxide is used as the positive electrode active material, the amount of charge is preferably set to less than or equal to half the theoretical capacity (274 mAh/g). For example, the charge can be performed at 0.1 C up to 120 mAh/g.

After S205, the keeping step is provided (S206). The keeping step can increase the thermal stability of the coating films on the surfaces of the positive electrode and the negative electrode. In the case where the power storage device is charged and discharged at high temperature, a gas is very likely to be generated. However, when the keeping step, in which a gas is generated, is provided during the initial charge and discharge process and then the step of removing the gas is provided, the gas can be removed by the initial charge and discharge process.

The temperature in the keeping step is preferably higher than room temperature, in which case the cycle performance can be enhanced. However, if the temperature is excessively high, aluminum, which is used as a positive electrode current collector, might corrode, the irreversible capacity might increase, or a lithium salt might decompose. For this reason, the power storage device is preferably kept at approximately 40° C. For example, a step of keeping the power storage device at 40° C. for 24 hours can be provided.

After the charge under the second condition, a second step of removing a gas from the region surrounded by the exterior body is performed (S207). In the second step of removing the gas from the region surrounded by the exterior body, the exterior body 110 is partly cut to form an opening. The second step of removing the gas from the region surrounded by the exterior body is also preferably performed while pressure is applied. Furthermore, it is preferably performed under reduced pressure, in which case a gas is more easily removed.

The opening from which the second step of removing the gas from the region surrounded by the exterior body is performed is sealed (S208).

Although the step of removing a gas from a region surrounded by the exterior body by opening the exterior body is performed twice in total, that is, at the time of adding the third solvent and after the keeping step, in this embodiment, one embodiment of the present invention is not limited thereto. The number of times of performing the step of removing a gas from a region surrounded by the exterior body may be only one at the time of adding the third solvent or three or more. In other words. S206 and S207 are not necessarily performed or may be repeated more than once. Reducing the number of times of performing the step of removing a gas from a region surrounded by the exterior body leads to an increase in production efficiency. In contrast, performing the step of removing a gas from a region surrounded by the exterior body more than once can further reduce the gas contained in the cell.

Next, charge is performed under a third condition while pressure is applied using the pressurizing instrument illustrated in FIGS. 5A and 5B (S209). Specifically, charge is performed at a rate of 0.1 C or more and less than 1 C. The charging rate of the third condition may be the same as that of the second condition. Furthermore, for the charge, constant current constant voltage (CCCV) charge may be performed with a termination voltage set to, for example, 4.3 V. At this stage, first charge ends.

Here, constant current (CC) charge, CCCV charge, and CC discharge will be described.

<<CC Charge>>

Figure 7A:
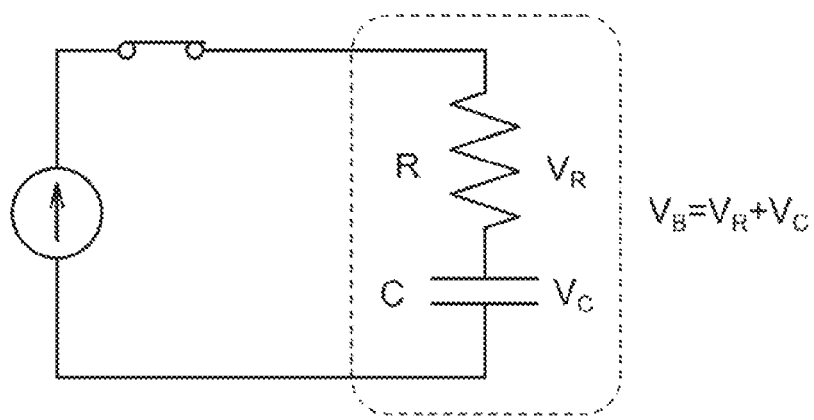
FIGS. 7A to 7C are circuit diagrams and a graph for describing CC charge.

CC charge will be described. CC charge is a charging method in which a constant current is made to flow to a power storage device in the whole charging period and charge is terminated when the voltage reaches a predetermined voltage. The power storage device is assumed to be an equivalent circuit with internal resistance R and power storage device capacitance C as illustrated in FIG. 7A. In that case, a power storage device voltage $V_B$ is the sum of a voltage $V_R$ applied to the internal resistance R and a voltage $V_C$ applied to the power storage device capacitance C.

While the CC charge is performed, a switch is on as illustrated in FIG. 7A, so that a constant current I flows to the power storage device. During the period, the current I is constant; thus, according to the Ohm's law ($V_R = R \times I$), the voltage $V_R$ applied to the internal resistance R is also constant. In contrast, the voltage $V_C$ applied to the power storage device capacitance C increases over time. Accordingly, the power storage device voltage $V_B$ increases over time.

Figure 7B:
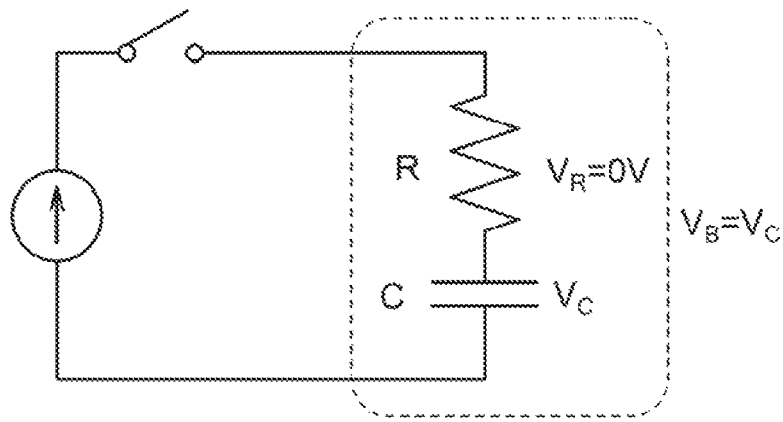

When the power storage device voltage $V_B$ reaches a predetermined voltage, e.g., 4.1 V, the charge is terminated. On termination of the CC charge, the switch is turned off as illustrated in FIG. 7B, and the current I becomes 0. Thus, the voltage $V_R$ applied to the internal resistance R becomes 0 V. Consequently, the power storage device voltage $V_B$ is decreased by the lost voltage drop in the internal resistance R.

Figure 7C:
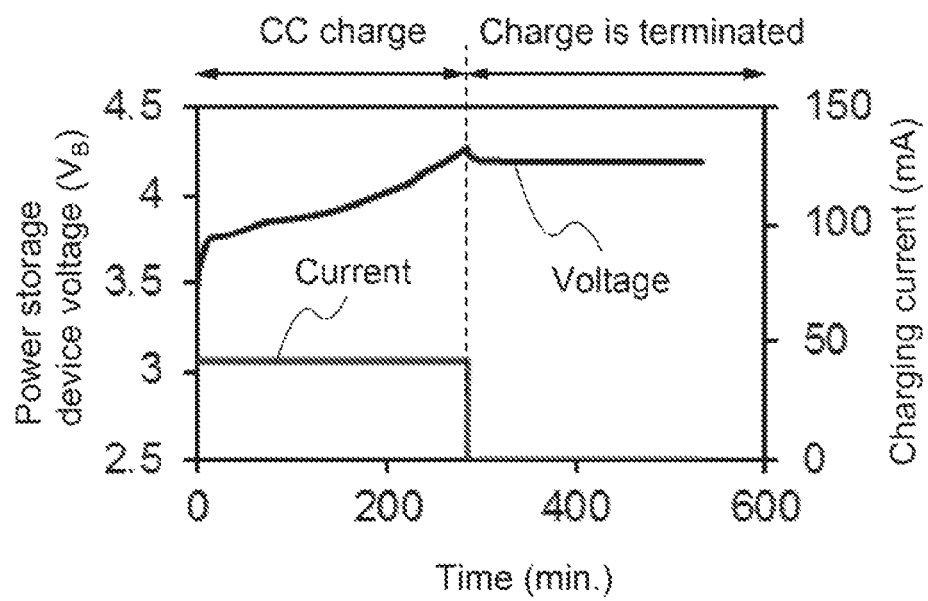

FIG. 7C shows an example of the power storage device voltage $V_B$ and charging current during a period in which the CC charge is performed and after the CC charge is terminated. The power storage device voltage $V_B$ increases while the CC charge is performed, and slightly decreases after the CC charge is terminated.

<<CCCV Charge>>

Next, CCCV charge will be described. CCCV charge is a charging method in which CC charge is performed until the voltage reaches a predetermined voltage and then constant voltage (CV) charge is performed until the amount of current flow becomes small, specifically, a termination current value.

Figure 8A:
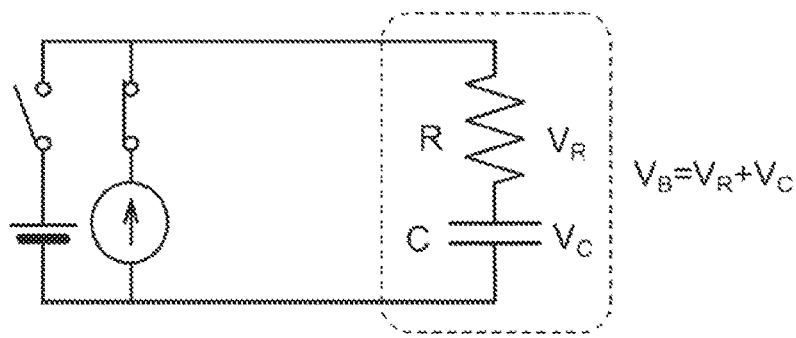
FIGS. 8A to 8D are circuit diagrams and a graph for describing CCCV charge.

While the CC charge is performed, a switch of a constant current power source is on and a switch of a constant voltage power source is off as illustrated in FIG. 8A, so that the constant current I flows to a power storage device. During the period, the current I is constant; thus, according to the Ohm's law ($V_R = R \times I$), the voltage $V_R$ applied to the internal resistance R is also constant. In contrast, the voltage $V_C$ applied to the power storage device capacitance C increases over time. Accordingly, the power storage device voltage $V_B$ increases over time.

Figure 8B:
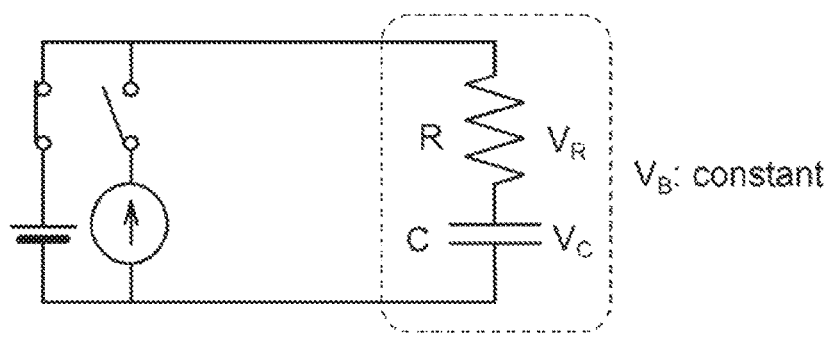

When the power storage device voltage $V_B$ reaches a predetermined voltage, e.g., 4.3 V, switching is performed from the CC charge to the CV charge. While the CV charge is performed, the switch of the constant voltage power source is on and the switch of the constant current power source is off as illustrated in FIG. 8B; thus, the power storage device voltage $V_B$ is constant. In contrast, the voltage $V_C$ applied to the power storage device capacitance C increases over time. Since $V_B = V_R + V_C$ is satisfied, the voltage $V_R$ applied to the internal resistance R decreases over time. As the voltage $V_R$ applied to the internal resistance R decreases, the current I flowing to the power storage device also decreases according to the Ohm's law ($V_R = R \times I$).

Figure 8C:
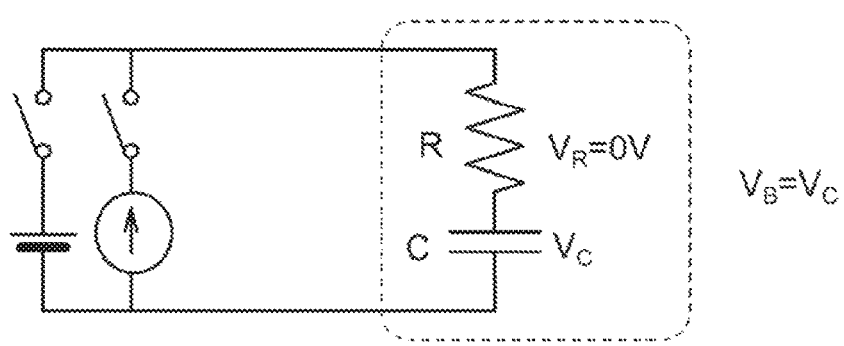

When the current I flowing to the power storage device becomes a predetermined current, e.g., approximately 0.01 C, charge is terminated. On termination of the CCCV charge, all the switches are turned off as illustrated in FIG. 8C, so that the current I becomes 0. Accordingly, the voltage $V_R$ applied to the internal resistance R becomes 0 V. However, the voltage $V_R$ applied to the internal resistance R becomes sufficiently small by the CV charge; thus, even when a voltage drop no longer occurs in the internal resistance R, the power storage device voltage $V_B$ hardly decreases.

Figure 8D:
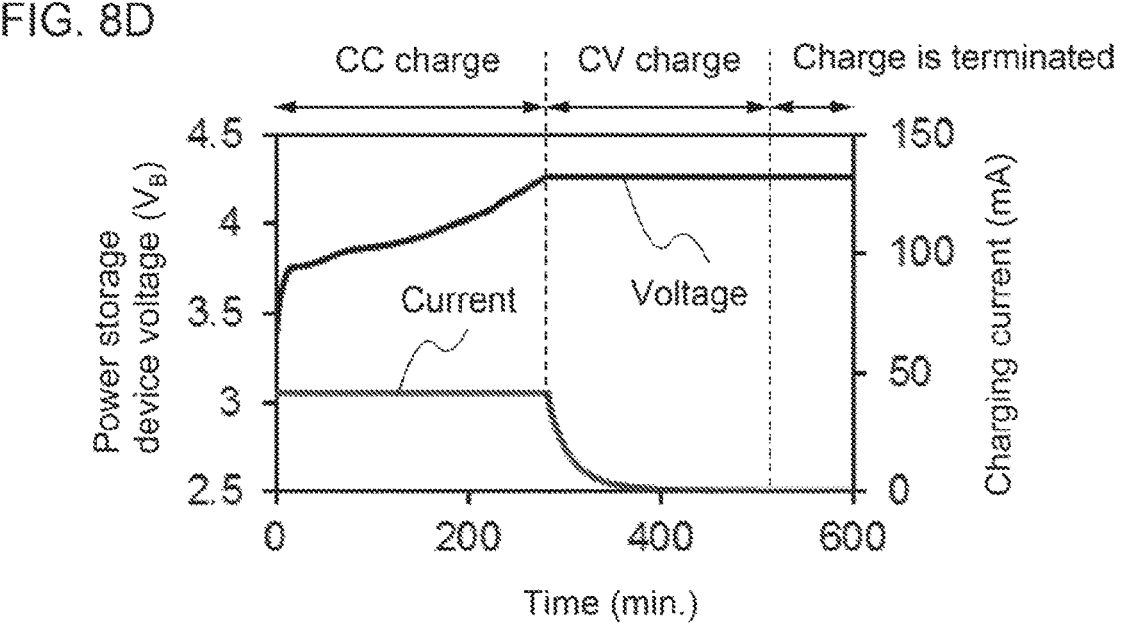

FIG. 8D shows an example of the power storage device voltage $V_B$ and charging current while the CCCV charge is performed and after the CCCV charge is terminated. Even after the CCCV charge is terminated, the power storage device voltage $V_B$ hardly decreases.

<<CC Discharge>>

Next, CC discharge will be described. CC discharge is a discharging method in which a constant current is made to flow from a power storage device in the whole discharging period and discharge is ended when the power storage device voltage $V_B$ reaches a predetermined voltage, e.g., 2.5 V.

Figure 9:
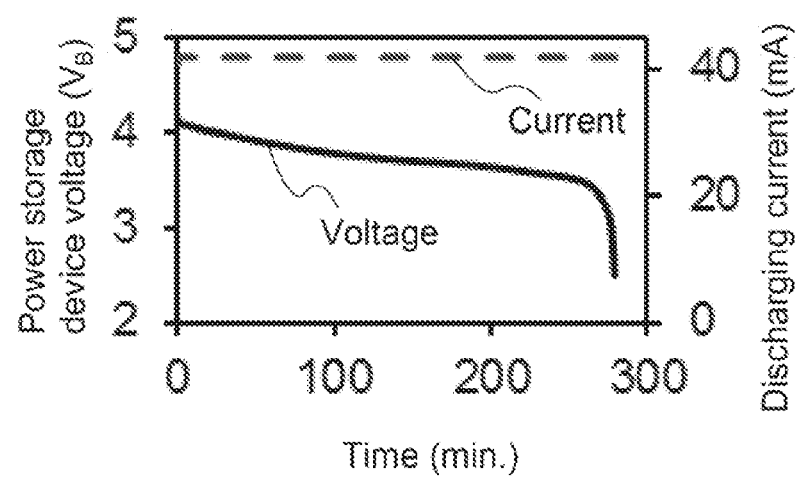
FIG. 9 is a graph illustrating CC discharge.

FIG. 9 shows an example of the power storage device voltage $V_B$ and discharging current while the CC discharge is performed. As discharge proceeds, the power storage device voltage $V_B$ decreases.

Next, a discharge rate and a charge rate will be described. The discharge rate refers to the relative ratio of discharging current to battery capacity and is expressed in a unit C. A current of approximately 1 C in a battery with a rated capacity X (Ah) is X A. The case where discharge is performed at a current of 2X A is rephrased as follows: discharge is performed at 2 C. The case where discharge is performed at a current of X'S A is rephrased as follows: discharge is performed at 0.2 C. Similarly, the case where charge is performed at a current of 2K A is rephrased as follows: charge is performed at 2 C. and the case where charge is performed at a current of X/5 A is rephrased as follows: charge is performed at 0.2 C.

Next, discharge is performed while pressure is applied using the pressurizing instrument illustrated in FIGS. 5A and 5B (S210). For example, CC discharge can be performed with a termination voltage set to 2.5 V.

Subsequently, full charge is performed while pressure is applied using the pressurizing instrument in FIGS. 5A and 5B and then discharge is performed (S211). Full charge is performed two more times and then discharge is performed, so that the cell 200 can be completed. For example, for the charge. CCCV charge can be performed with a termination voltage set to 4.3 V. and for the discharge, CC discharge can be performed with a termination voltage set to 2.5 V. The charging and discharging rate can be 0.2 C, for example.

The cell 200 is a power storage device containing the second electrolytic solution. The first solvent content in the second electrolytic solution is preferably 60 vol % or less. Reducing the first solvent content in the whole second electrolytic solution to 60 vol % or less can reduce the viscosity of the whole second electrolytic solution and ensures the low-temperature characteristics. That is to say, the cell 200 has excellent cycle performance and can be used in an environment at a temperature ranging from −40° C. to 80° C. inclusive.

Note that in one embodiment of the present invention, bonding the facing portions of the separator to each other is not necessarily performed to cover the positive electrode 111 and the negative electrode 115 with the separator 107. The separator 107 may alternatively be a strip-shaped separator positioned between the positive electrode 111 and the negative electrode 115 as long as the separator 107 can prevent contact between the positive electrode 111 and the negative electrode 115 in the cell 200.

Furthermore, in one embodiment of the present invention, the number of each of the positive electrode 111, the negative electrode 115, and the separator 107 is not necessarily one. The number of each of the positive electrode 111, the negative electrode 115, and the separator 107 used in fabricating a power storage device may be more than one.

Furthermore, in one embodiment of the present invention, the positive electrode 111 in which one surface of the positive electrode current collector 101 is provided with the positive electrode active material layer 102 and the negative electrode 115 in which one surface of the negative electrode current collector 105 is provided with the negative electrode active material layer 106 are not necessarily used. A positive electrode in which opposite surfaces of a positive electrode current collector are provided with positive electrode active material layers may be used. A negative electrode in which opposite surfaces of a negative electrode current collector are provided with negative electrode active material layers may be used. Alternatively, a positive electrode in which opposite surfaces of a positive electrode current collector are provided with positive electrode active material layers and a positive electrode in which one surface of a positive electrode current collector is provided with a positive electrode active material layer may be used in combination. A negative electrode in which opposite surfaces of a negative electrode current collector are provided with negative electrode active material layers and a negative electrode in which one surface of a negative electrode current collector is provided with a negative electrode active material layer may be used in combination.

This embodiment can be implemented in combination with any of the other embodiments.

Embodiment 3

Described in this embodiment will be examples of electronic devices including the power storage devices described in Embodiment 1 and Embodiment 2.

FIGS. 10A to 10F illustrate other examples of electronic devices each including a power storage device. Examples of electronic devices each including a power storage device include television devices (also referred to as televisions or television receivers), monitors of computers or the like, cameras such as digital cameras and digital video cameras, digital photo frames, cellular phones (also referred to as mobile phones or mobile phone devices), portable game machines, portable information terminals, audio reproducing devices, and large game machines such as pachinko machines.

In addition, a power storage device can be incorporated along a curved inside/outside wall surface of a house or a building or a curved interior/exterior surface of a car.

FIG. 10A illustrates an example of a cellular phone. A cellular phone 7400 includes a display portion 7402 incorporated in a housing 7401, operation buttons 7403, an external connection port 7404, a speaker 7405, a microphone 7406, and the like. Note that the cellular phone 7400 includes a power storage device 7407.

FIG. 10B illustrates the cellular phone 7400 that is bent. When the whole cellular phone 7400 is bent by external force, the power storage device 7407 included in the cellular phone 7400 is also bent. FIG. 10C illustrates the bent power storage device 7407. The power storage device 7407 is a thin power storage device. The power storage device 7407 is fixed while being bent. Note that the power storage device 7407 includes a lead electrode 7408 electrically connected to a current collector 7409.

FIG. 10D illustrates an example of a bangle display device. A portable display device 7100 includes a housing 7101, a display portion 7102, operation buttons 7103, and a power storage device 7104. FIG. 10E illustrates the bent power storage device 7104. When the display device is worn on a user's arm while the power storage device 7104 is bent, the shape of the housing changes to change the curvature of part or the whole of the power storage device 7104. Note that the radius of curvature of a curve at a point refers to the radius of the circular arc that best approximates the curve at that point. The reciprocal of the radius of curvature is curvature. Specifically, part or the whole of the housing or the main surface of the power storage device 7104 is changed in the range of radius of curvature from 40 mm to 150 mm inclusive. When the radius of curvature at the main surface of the power storage device 7104 is 40 mm to 150 mm inclusive, the reliability can be kept high.

Furthermore, the flexile power storage device which can be bent by external force can be provided with high space efficiency in any of a variety of electronic devices. For example, in a stove 7500 illustrated in FIG. 10F, a module 7511 is attached to a main body 7512. The module 7511 includes a power storage device 7501, a motor, a fan, an air outlet 7511*a*, and a thermoelectric generation device. In the stove 7500, after a fuel is injected through an opening 7512*a* and ignited, outside air can be sent through the air outlet 7511*a* to the inside of the stove 7500 by rotating the motor and the fan which are included in the module 7511 using power of the power storage device 7501. In this manner, the stove 7500 can have strong heating power because outside air can be taken into the inside of the stove 7500 efficiently. In addition, cooking can be performed on an upper grill 7513 with thermal energy generated by the combustion of fuel. When the thermal energy is converted into power with the thermoelectric generation device of the module 7511, the power can be stored in the power storage device 7501. The power stored in the power storage device 7501 can be output through an external terminal 7511*b*.

Figure 11A:
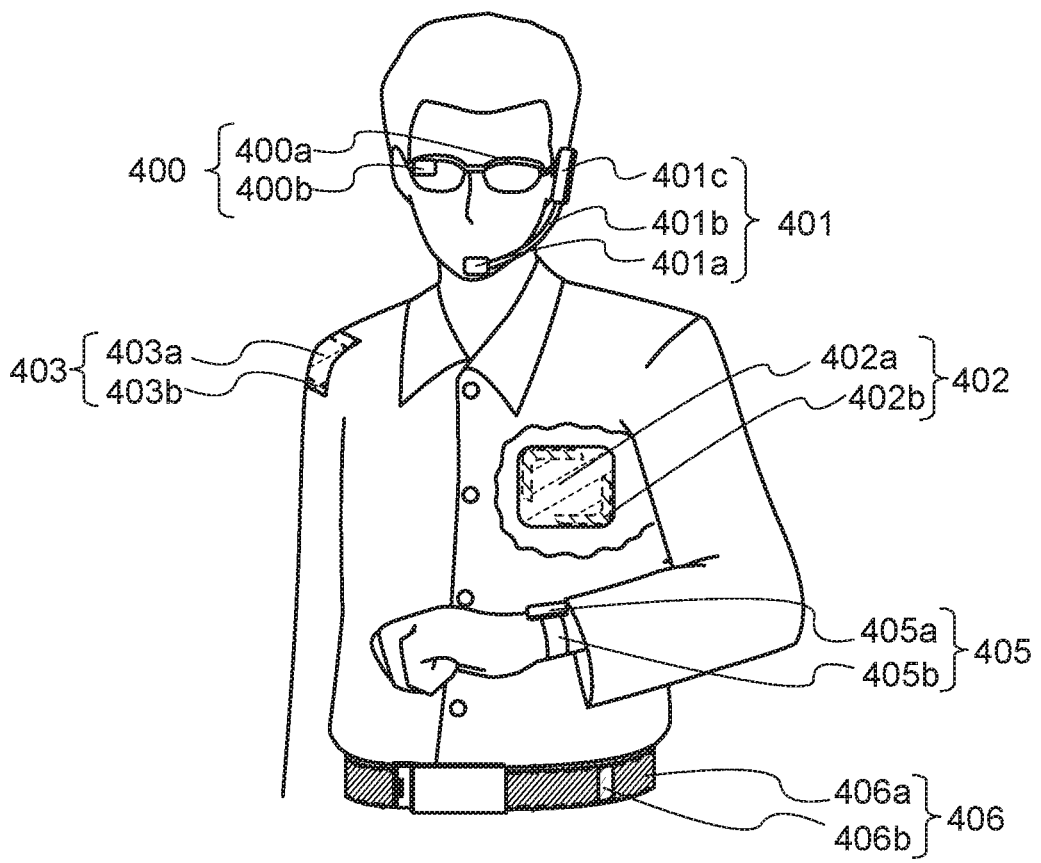
FIGS. 11A and 11B each illustrate an electronic device of one embodiment of the present invention.

The power storage device described in Embodiment 1 can be provided in wearable devices illustrated in FIG. 11A.

For example, the power storage device can be provided in a glasses-type device 400 illustrated in FIG. 11A. The glasses-type device 400 includes a frame 400*a* and a display portion 400*b*. The power storage device is provided in a temple of the frame 400*a* having a curved shape, whereby the glasses-type device 400 can have a well-balanced weight and can be used continuously for a long time.

The power storage device can also be provided in a headset-type device 401. The headset-type device 401 includes at least a microphone portion 401*a*, a flexible pipe 401*b*, and an earphone portion 401*c*. The power storage device can be provided in the flexible pipe 401*b* and the earphone portion 401*c*.

Furthermore, the power storage device can be provided in a device 402 that can be attached directly to a body. A power storage device 402*b* can be provided in a thin housing 402*a* of the device 402.

Furthermore, the power storage device can be provided in a device 403 that can be attached to clothes. A power storage device 403*b* can be provided in a thin housing 403*a* of the device 403.

Furthermore, the power storage device can be provided in a watch-type device 405. The watch-type device 405 includes a display portion 405*a* and a belt portion 405*b*, and the power storage device can be provided in the display portion 405*a* or the belt portion 405*b*.

The display portion 405*a* can display various kinds of information such as time and reception information of an e-mail or an incoming call.

In addition, the watch-type device 405 is a wearable device that is wound around an arm directly; thus, a sensor that measures the pulse, the blood pressure, or the like of the user may be incorporated therein. Data on the exercise quantity and health of the user can be stored to be used for health maintenance.

Furthermore, the power storage device can be provided in a belt-type device 406. The belt-type device 406 includes a belt portion 406*a* and a wireless power feeding and receiving portion 406*b*, and the power storage device can be provided inside the belt portion 406*a*.

Figure 11B:
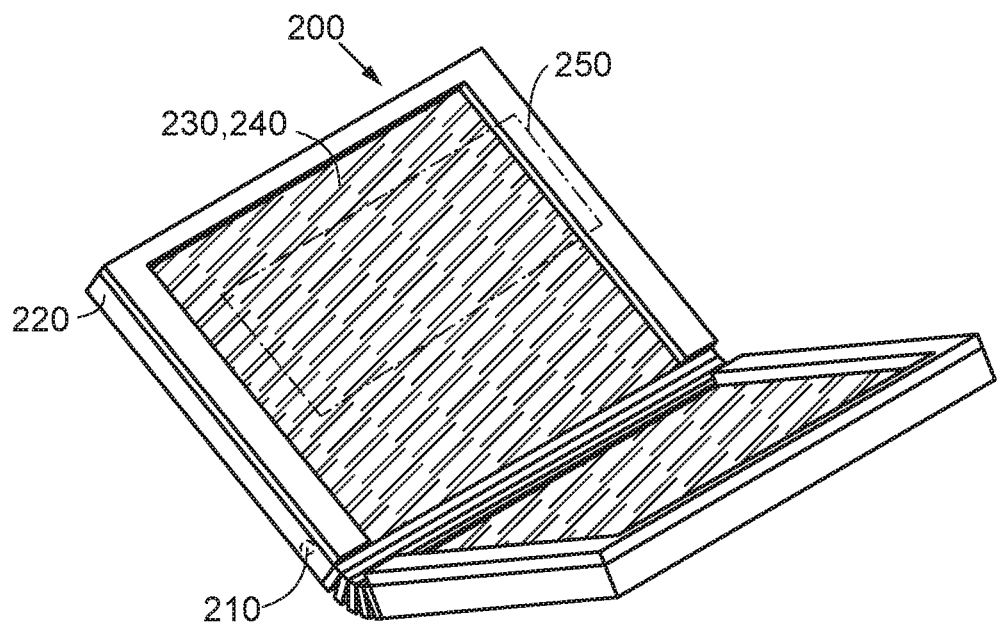

FIG. 11B is a projection view illustrating an example of an external view of an information processing device 200. The information processing device 200 described in this embodiment includes an arithmetic device 210, an input/output device 220, a display portion 230, and a power storage device 250.

The information processing device 200 includes a communication portion having a function of supplying data to a network and acquiring data from the network. Furthermore, image data may be generated in accordance with received data delivered to a specific space using the communication portion. For example, educational materials can be fed from a classroom of a school or a university and displayed to be used as a schoolbook. Alternatively, materials distributed from a conference room in, for example, a company can be received and displayed.

This embodiment can be freely combined with Embodiment 1.

Embodiment 4

Described in this embodiment will be examples of a vehicle including the power storage device described in Embodiment 1.

The use of the power storage device in vehicles can lead to next-generation clean energy vehicles such as hybrid electric vehicles (HEVs), electric vehicles (EVs), and plug-in hybrid electric vehicles (PHEVs).

Figure 12A:
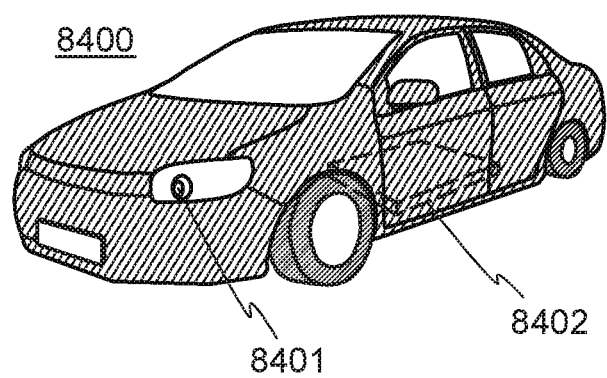
FIGS. 12A and 12B each illustrate an electronic device of one embodiment of the present invention.

An automobile 8400 illustrated in FIG. 12A is an example of a hybrid electric vehicle (HEV) provided with a power storage device 8402. The power storage device 8402 is used as a power supply for driving a vehicle or a power supply of a headlight 8401 or the like.

Figure 12B:
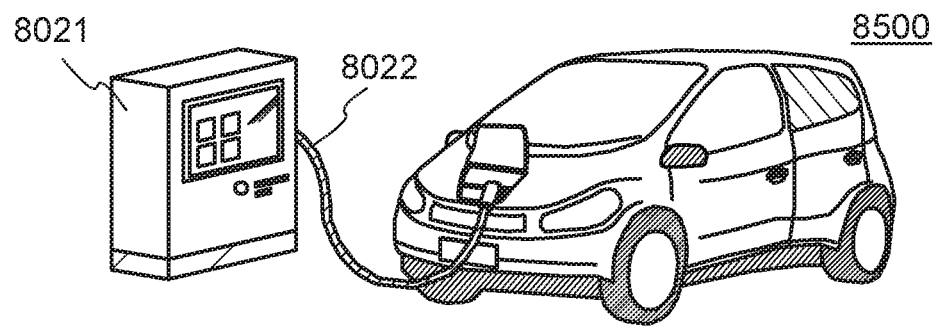

FIG. 12B illustrates an automobile 8500, which is an EV including the power storage device. The automobile 8500 can be charged when the power storage device is supplied with electric power through external charging equipment by a plug-in system, a contactless power feeding system, or the like. In FIG. 12B, a power storage device included in the automobile 8500 is charged with the use of a ground-based charging apparatus 8021 through a cable 8022. In charge, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the power storage device included in the automobile 8500 can be charged by being supplied with electric power from outside. The charge can be performed by converting AC electric power into DC electric power through a converter such as an AC-DC converter.

Furthermore, although not illustrated, the vehicle may include a power receiving device so as to be charged by being supplied with electric power from an above-ground power transmitting device in a contactless manner. In the case of the contactless power feeding system, by fitting a power transmitting device in a road or an exterior wall, charge can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

Furthermore, the power storage device included in the vehicle can be used as a power source for supplying electric power to products other than the vehicle. In such a case, the use of a commercial power source can be avoided at peak time of electric power demand.

An example of a motorcycle using one embodiment of the present invention will be described with reference to FIG. 13.

Figure 13:
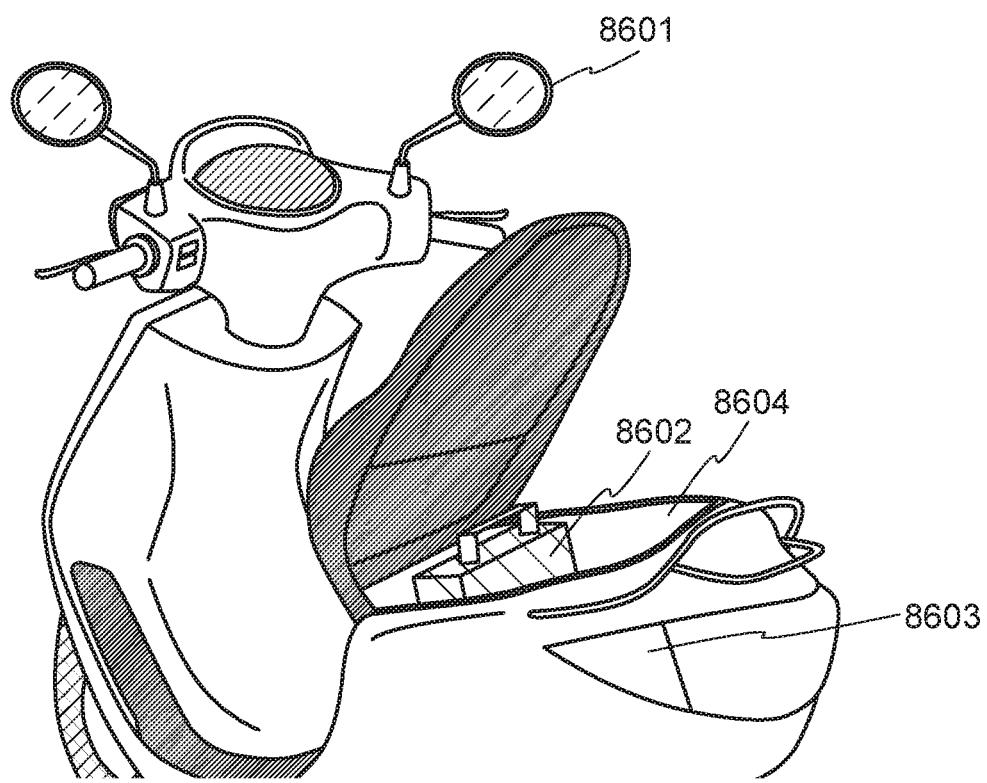
FIG. 13 illustrates an electronic device of one embodiment of the present invention.

A motor scooter 8600 illustrated in FIG. 13 includes a power storage device 8602, side mirrors 8601, and indicators 8603. The power storage device 8602 can supply electric power to the indicators 8603.

Furthermore, in the motor scooter 8600 illustrated in FIG. 13, the power storage device 8602 can be held in a storage unit under seat 8604. The power storage device 8602 can be held in the storage unit under seat 8604 even with a small size.

The power storage device 8602 used in this embodiment has excellent cycle performance and thus can be used for a long time. Furthermore, the power storage device 8602 in this embodiment can be used over a wide environmental temperature range and thus is useful.

Example 1

In this example, to acquire more detailed information about decomposition of an electrolytic solution and formation of coating films accompanying the decomposition of the electrolytic solution, solvents used for an electrolytic solution were selected and analysis was performed to compare power storage device samples using deuterated products of the solvents and a power storage device sample using the normal solvents.

Specifically, EC and DEC were used as solvents of the electrolytic solutions in the lithium-ion secondary batteries, and three samples, a sample using normal EC and normal DEC, a sample using deuterated EC and normal DEC, and a sample using normal EC and deuterated DEC, were fabricated. The three samples were subjected to an initial charge and discharge process and then decomposition products of the electrolytic solutions and coating films on negative electrodes and positive electrodes were analyzed. For the analysis, liquid chromatography-tandem mass spectrometry (LC/MS/MS) and time-of-flight secondary ion mass spectrometry (ToF-SIMS) were employed.

<Fabrication of Samples for LC/MS/MS and ToF-SIMS>

$LiPF_6$ and LiFSA were used as electrolytes of electrolytic solutions in all of Sample 1, Sample 2, and Sample 3. Measurement was performed such that the concentration of $LiPF_6$ was 0.8 mol/L and the concentration of LiFSA was 0.5 mol/L.

Next, EC and DEC as the solvents of the electrolytic solutions in the samples were measured. $LiPF_6$, LiFSA, and EC were mixed into DEC and the mixture was stirred so that $LiPF_6$, LiFSA, and EC were dissolved in DEC. The resulting solution is referred to as an electrolytic solution before charge and discharge.

The ratios of the solvents of the electrolytic solutions in Sample 1, Sample 2, and Sample 3 are as follows.

Sample 1: EC:DEC=1:1 (volume ratio)

Sample 2: deuterated EC (EC-d):DEC=1:1 (volume ratio)

Sample 3: EC:deuterated DEC (DEC-d)=1:1 (volume ratio)

Note that in this specification and the like, reagents produced by Wako Pure Chemical Industries, Ltd. were used as deuterated EC and deuterated DEC. In addition, reagents produced by Kishida Chemical Co., Ltd. were used as normal EC, normal DEC. $LiPF_6$, LiFSA, and $V_C$ used in another example.

Chemical Formulae 1 show the structural formulae of EC and DEC used in Sample 1. Chemical Formulae 2 show the structural formulae of EC-d and DEC used in Sample 2. Chemical Formulae 3 show the structural formulae of EC and DEC-d used in Sample 3.

[Chemical Formulae 1]

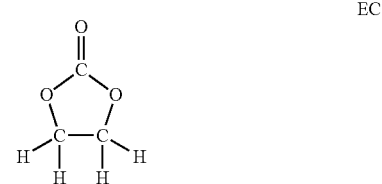

EC

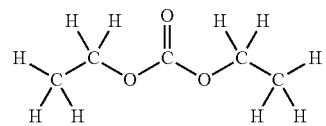

DEC

[Chemical Formulae 2]

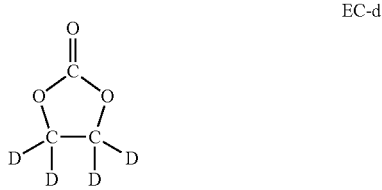

EC-d

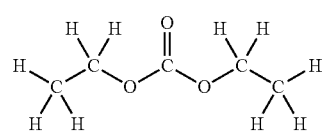

DEC

[Chemical Formulae 3]

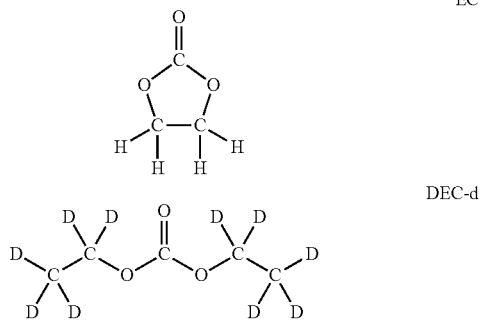

Materials other than the above in each of the samples are as follows: LiCoO$_2$ was used as a positive electrode active material included in a positive electrode active material layer; acetylene black (AB) was used as a positive electrode conductive additive; polyvinylidene fluoride (PVDF) was used as a positive electrode binder; 20-μm-thick aluminum foil was used as a positive electrode current collector: graphite was used as a negative electrode active material included in a negative electrode active material layer; carboxymethylcellulose (CMC) and styrene-butadiene rubber (SBR) were used as negative electrode binders: 18-μm-thick copper foil was used as a negative electrode current collector: 25-μm-thick polypropylene was used as a separator: and a 113-μm-thick laminated film including aluminum foil was used as an exterior body.

For each of the samples, the positive electrode was fabricated in such a manner that a slurry formed by mixing the positive electrode active material, the positive electrode conductive additive, and the positive electrode binder with N-methyl-2-pyrrolidone (NMP) was applied to the positive electrode current collector to form the positive electrode active material layer, drying was performed, and punching was performed to obtain a predetermined shape. The area of a region of the positive electrode current collector to which the positive electrode active material was applied is 20.5 cm$^2$. The negative electrode was fabricated in such a manner that a slurry formed by mixing the negative electrode active material and the negative electrode binders with water was applied to the negative electrode current collector to form the negative electrode active material layer, drying was performed, and punching was performed to obtain a predetermined shape. The area of a region of the negative electrode current collector to which the negative electrode active material was applied is 23.8 cm$^2$.

Then, the positive electrode, the separator, and the negative electrode were stacked and covered with the laminated film, the electrolytic solution of the above corresponding condition was injected in each sample cell, and the laminated film was sealed by thermal welding, so that each of the cells of Sample 1, Sample 2, and Sample 3 was fabricated. The thickness of each of the cells is approximately 0.45 mm.

<<Initial Charge and Discharge Process>>

Next, each of the cells of Sample 1, Sample 2, and Sample 3 fabricated in the aforementioned manner was subjected to an initial charge and discharge process. The initial charge and discharge process is as follows.

1. Charge was performed at 0.01 C up to 15 mAh/g.
2. The laminated film was cut and opened and then the cell was pressurized with a roller to remove a gas from the cell.
3. The laminated film was sealed by thermal welding.
4. Charge was performed at 0.1 C up to 120 mAh/g.
5. The cell was kept at 40° C. for 24 hours.
6. The laminated film was cut and opened and then the cell was pressurized with a roller to remove a gas from the cell.
7. The laminated film was sealed by thermal welding.
8. Charge was performed at 0.1 C up to 170 mAh/g.
9. CC discharge was performed to 2.5 V at 0.2 C.
10. CCCV charge was performed to 4.3 V at 0.2 C.
11. CC discharge was performed to 2.5 V at 0.2 C.
12. Steps 10 and 11 were repeated twice.

Note that in this specification and the like, the amount of charge in the initial charge and discharge process, for example, the amount of charge in each of Step 1, Step 4, and Step 8 is the amount of charge per gram of the positive electrode active material. The term "full charge" means the state where charge at a voltage controlled to be 4.3 V to a current value of 0.01 C is completed.

Note that the charging steps and the discharging steps such as Step 1, Step 4, and Steps 8 to 12 in the initial charge and discharge process were performed with the cell pressurized. The pressure was applied with the cell sandwiched by a pressurizing instrument so that the positive electrode and the negative electrode included in the cell were evenly pressurized.

Pressurizing the cell can inhibit a phenomenon in which an electrode layer is separated from the current collector in charge. Furthermore, the gas contained in the electrolytic solution and the gas generated by the decomposition of the electrolytic solution can be prevented from remaining between the positive electrode and the negative electrode and inhibiting charge and discharge.

Furthermore, pressurizing the cell can reduce the distance between the positive electrode and the negative electrode included in the cell. When the content of EC as a solvent in the electrolytic solution is high as in this example, the viscosity of the electrolytic solution is high and thus lithium-ion transfer between the electrodes might be difficult; however, a reduction in the distance between the positive electrode and the negative electrode can lower the resistance of the cell.

Moreover, pressurizing the cell can inhibit formation of roughness of the positive electrode and the negative electrode. Formation of roughness of the positive electrode and the negative electrode generates variations in the distance between the positive electrode and the negative electrode in the cell. Thus, when the positive electrode and the negative electrode have roughness, lithium ions might concentrate in a region where the distance between the positive electrode and the negative electrode is short, easily causing lithium deposition on the negative electrode. However, pressurizing the cell to inhibit formation of roughness can prevent lithium deposition, resulting in an increase in the safety of the cell.

In this example, the pressurizing instrument illustrated in FIGS. 5A and 5B was used. Bolts and nuts as the fixing instrument 15a and the fixing instrument 15b and washers were fixed with a torque wrench. The torque was specified to be 0.1 N·m. As a cushioning, a rubber plate with a hardness of 50° was used.

The laminated film in each of Sample 1, Sample 2, and Sample 3 subjected to the above initial charge and discharge process was cut and opened in a glove box, acetonitrile was injected to the electrolytic solution, and the mixture was extracted. Then, the negative electrode and the positive electrode were taken out, washed with acetonitrile and dimethyl carbonate (DMC), and dried. The electrolytic solution obtained through the above steps is referred to as an electrolytic solution after charge and discharge. The negative electrode and the positive electrode obtained through the above steps are referred to as the negative electrode after charge and discharge and the positive electrode after charge and discharge, respectively.

<LC/MS/MS>

The electrolytic solution after charge and discharge and the electrolytic solution before charge and discharge in each of Sample 1, Sample 2, and Sample 3 were analyzed by LC/MS/MS to examine a decomposition product contained in the electrolytic solution after charge and discharge. Furthermore, the structural formula of the decomposition product was presumed from the LC/MS/MS analysis results. Note that in analysis by LC/MS/MS, acetonitrile was also added to the electrolytic solution before charge and discharge as in the case of the electrolytic solution after charge and discharge.

Figure 14:
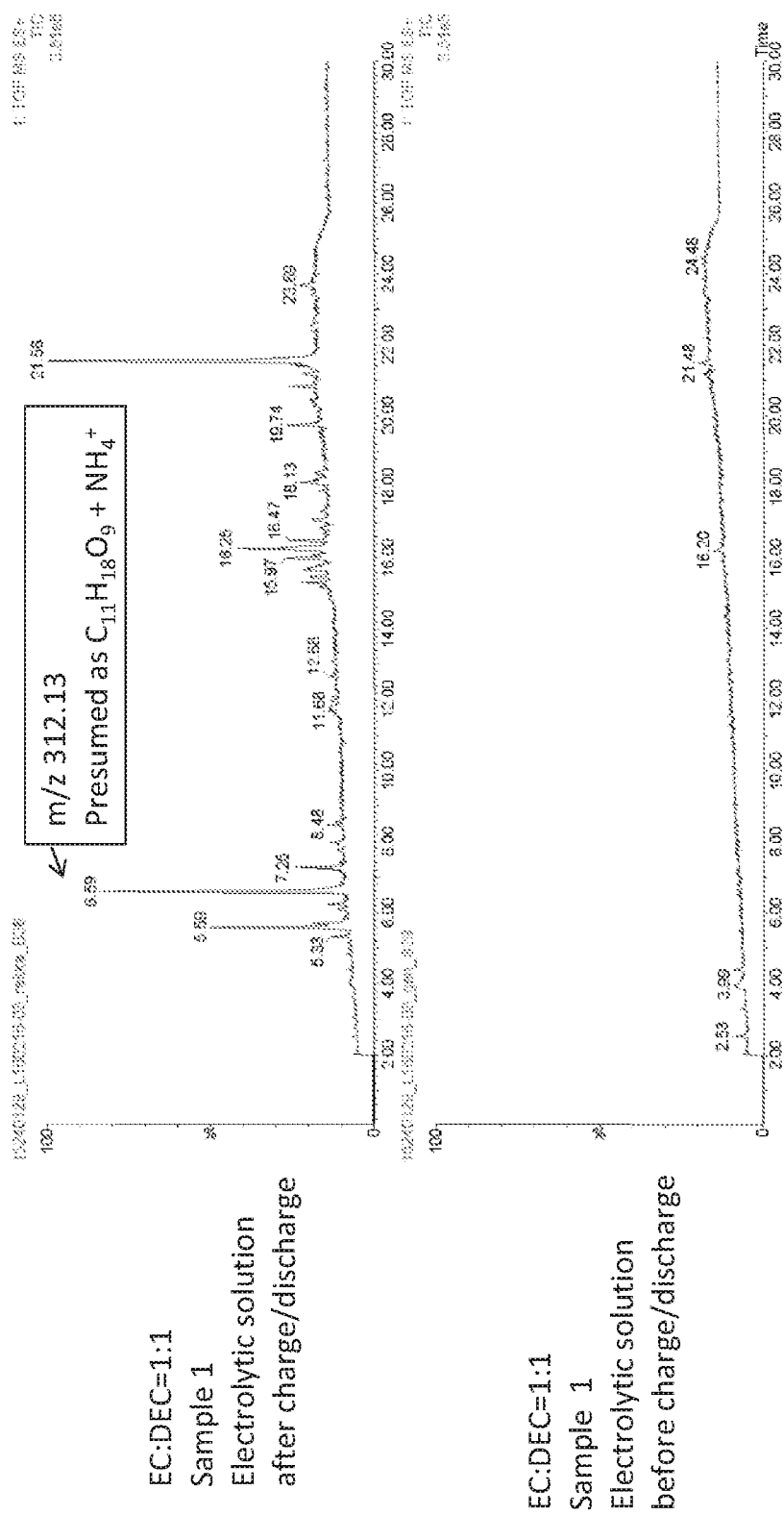
FIG. 14 shows total ion chromatograms (TICs) of LC/MS/MS analysis of Sample 1 in Example 1.
Figure 15:
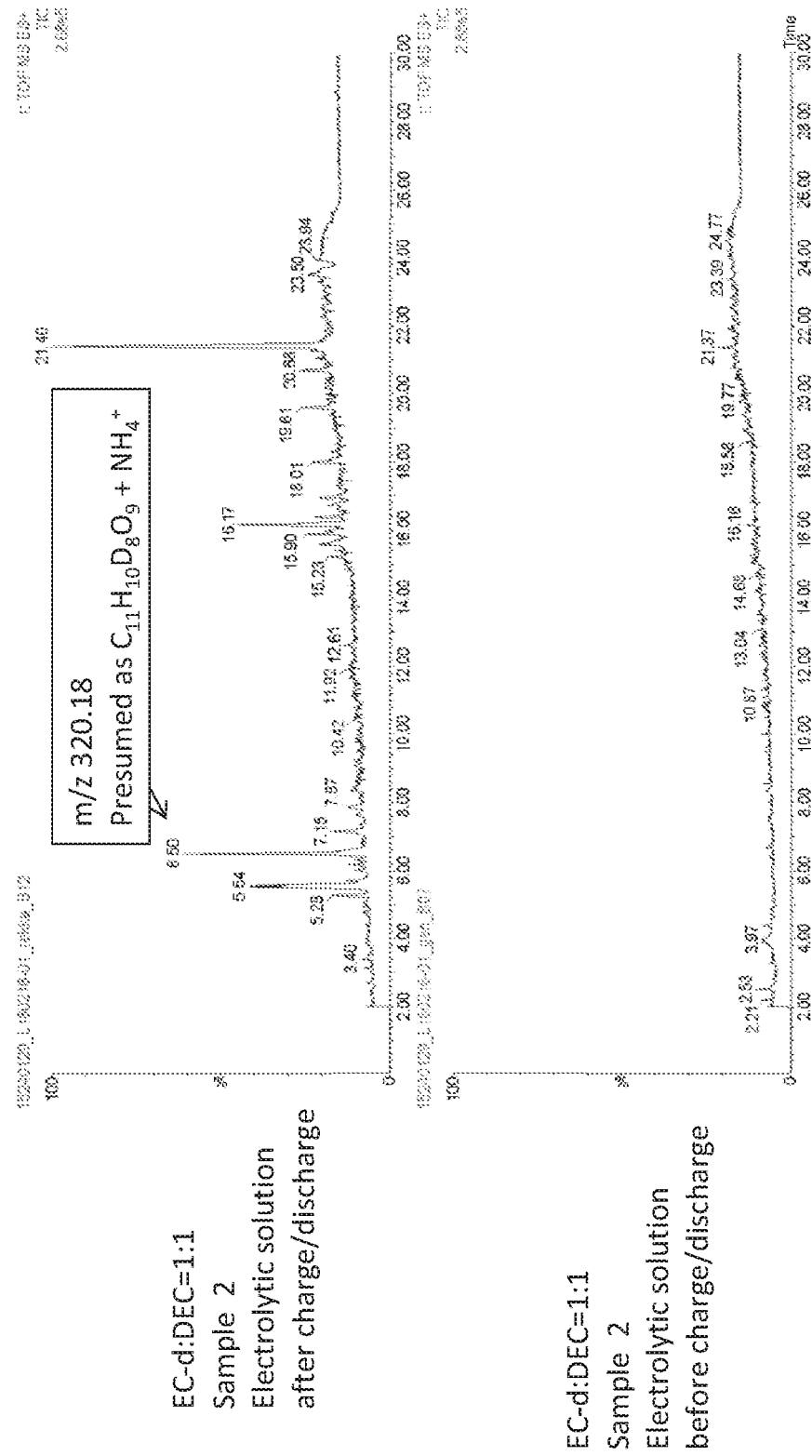
FIG. 15 shows TICs of LC/MS/MS analysis of Sample 2 in Example 1.
Figure 16:
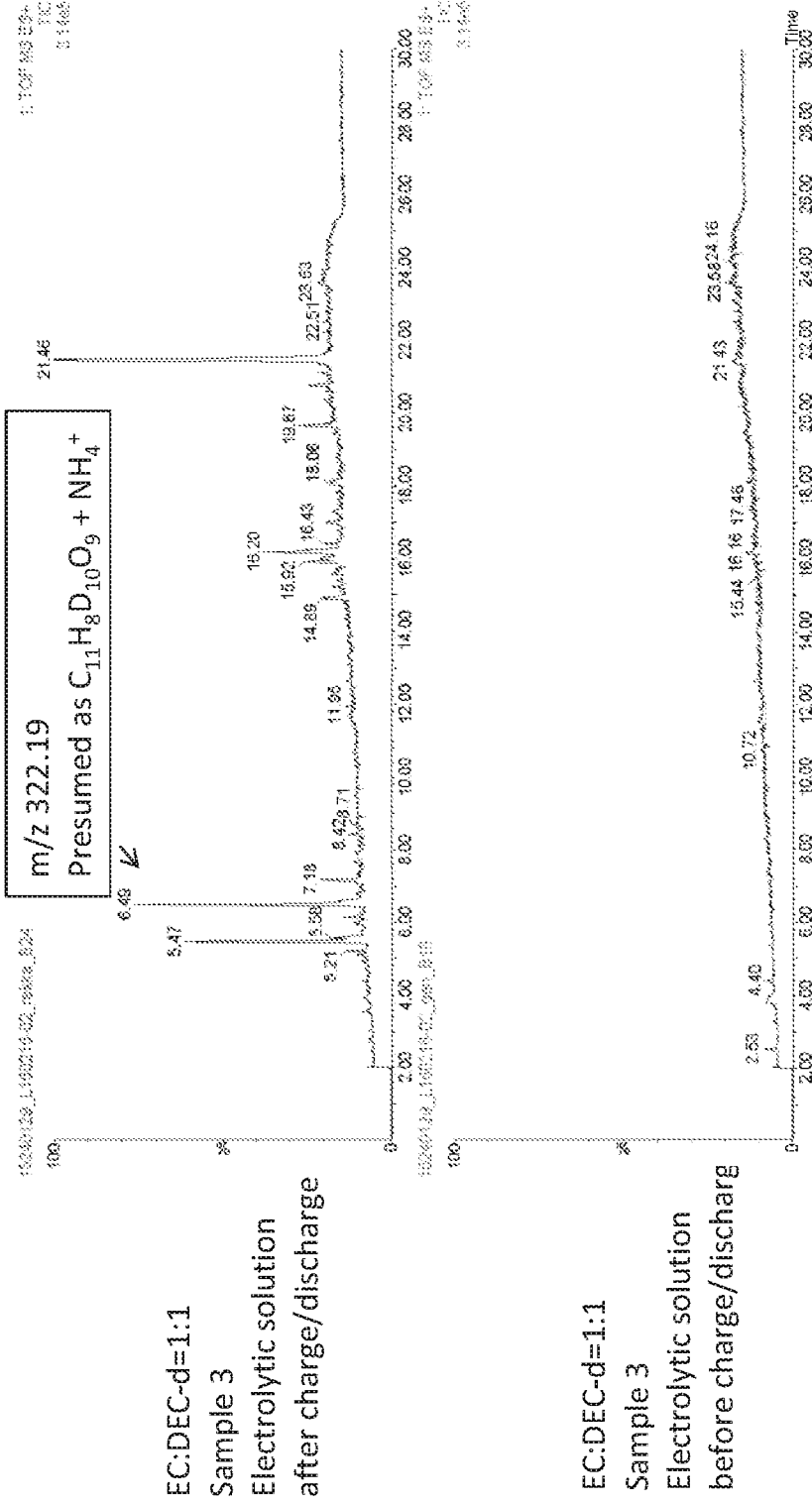
FIG. 16 shows TICs of LC/MS/MS analysis of Sample 3 in Example 1.

LC analysis conditions are as follows.
Apparatus: Acquity UPLC (produced by Waters Corporation)
Column: Acquits UPLC BEH C18 (2.1×100 mm, 1.7 nm)
Column temperature: 40° C.
Mobile phase A: 10 mmol/L of ammonium acetate aqueous solution
Mobile phase B: tetrahydrofuran:acetonitrile (at a volume ratio of 2:8)
A:B=99.5:0.5 (0 min.)→A:B=20:80 (15 min.)→A:B=1:99 (25 min.)→A:B=1:99 (30 min.)
Velocity of flow: 0.5 mL/min
Injection amount: 5 μL MS analysis conditions are as follows.
Apparatus: Xevo QT of MS (produced by Waters Corporation)
Mass range: m/z 50-1000
Ionization method: ESI Capillary vol.: 3.0 kV, Cone vol.: 15 V FIG. 14 shows total ion chromatograms (TICs) of the electrolytic solution after charge and discharge and the electrolytic solution before charge and discharge of Sample 1. FIG. 15 shows TICs of the electrolytic solution after charge and discharge and the electrolytic solution before charge and discharge of Sample 2. FIG. 16 shows TICs of the electrolytic solution after charge and discharge and the electrolytic solution before charge and discharge of Sample 3.

In FIG. 14, FIG. 15, and FIG. 16, the mass and presumed structural formula of a significantly clearly observed decomposition product with a relatively low molecular weight that is contained in each of the electrolytic solutions after charge and discharge and kept for longer than or equal to 5 minutes and shorter than or equal to 8 minutes are shown. As shown in FIG. 14, a decomposition product presumed to be $C_{11}H_{18}O_9$ was contained in the electrolytic solution after charge and discharge of Sample 1. As shown in FIG. 15, a decomposition product presumed to be $C_{11}H_{10}D_8O_9$ was contained in the electrolytic solution after charge and discharge of Sample 2. As shown in FIG. 16, a decomposition product presumed to be $C_{11}H_8D_{10}O_9$ was contained in the electrolytic solution after charge and discharge of Sample 3.

Chemical Formula 4 shows the presumed structural formula of the decomposition product contained in the electrolytic solution after charge and discharge of Sample 1, which is presumed to be $C_{11}H_{18}O_9$. Chemical Formula 5 shows the presumed structural formula of the decomposition product contained in the electrolytic solution after charge and discharge of Sample 2, which is presumed to be $C_{11}H_{10}D_8O_9$. Chemical Formula 6 shows the presumed structural formula of the decomposition product contained in the electrolytic solution after charge and discharge of Sample 3, which is presumed to be $C_{11}H_8D_{10}O_9$.

[Chemical Formula 4]

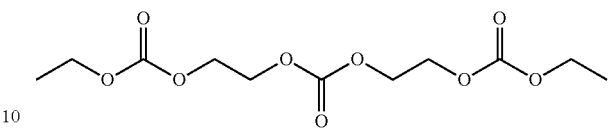

[Chemical Formula 5]

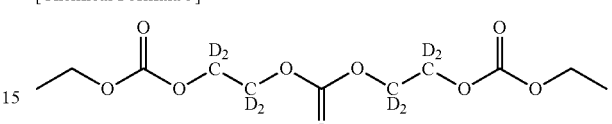

[Chemical Formula 6]

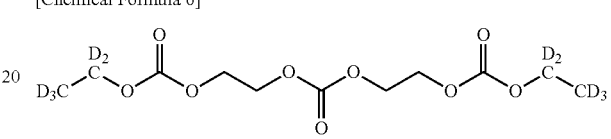

It is presumed from the above presumed structural formulae that each of the decomposition products with a relatively low molecular weight that was kept for longer than or equal to 5 minutes and shorter than or equal to 8 minutes is straight-chain, carbon, hydrogen, and oxygen at both ends of a molecule are derived from DEC, and carbon, hydrogen, and oxygen at the center of the molecule are derived from EC. This suggests that in the case where DEC is involved in the decomposition reaction of the electrolytic solution, a chain reaction of the decomposition of the solvent is terminated, and a decomposition product with a relatively low molecular weight is generated and dissolves into the electrolytic solution. In the case where DEC is not involved in the decomposition reaction of the electrolytic solution, presumably, a chain reaction of the decomposition of EC continues, and a decomposition product with a high molecular weight is generated and deposited as a coating film instead of dissolving into the electrolytic solution. The decomposition product with a relatively low molecular weight that dissolves into the electrolytic solution does not contribute to formation of the coating film. Thus, the generation amount of the decomposition product with a relatively low molecular weight is preferably low.

<ToF-SIMS>

Next, the surface of the negative electrode after charge and discharge and the surface of the positive electrode after charge and discharge of each of Sample 1, Sample 2, and Sample 3 were analyzed by ToF-SIMS. First, the outermost surfaces were analyzed, and then, the surfaces partly removed by a thickness of approximately 5 nm for $SiO_2$ by sputtering with a gas cluster ion beam (GCIB) were analyzed.

ToF-SIMS analysis conditions are as follows.
Apparatus: TOF.SIMS5-200P (produced by ION-TOF GmbH)
Primary ion source: Bi
Measurement mode: high mass resolution
Measurement area: 150 μm square <<Negative Electrode>>

Figure 17:
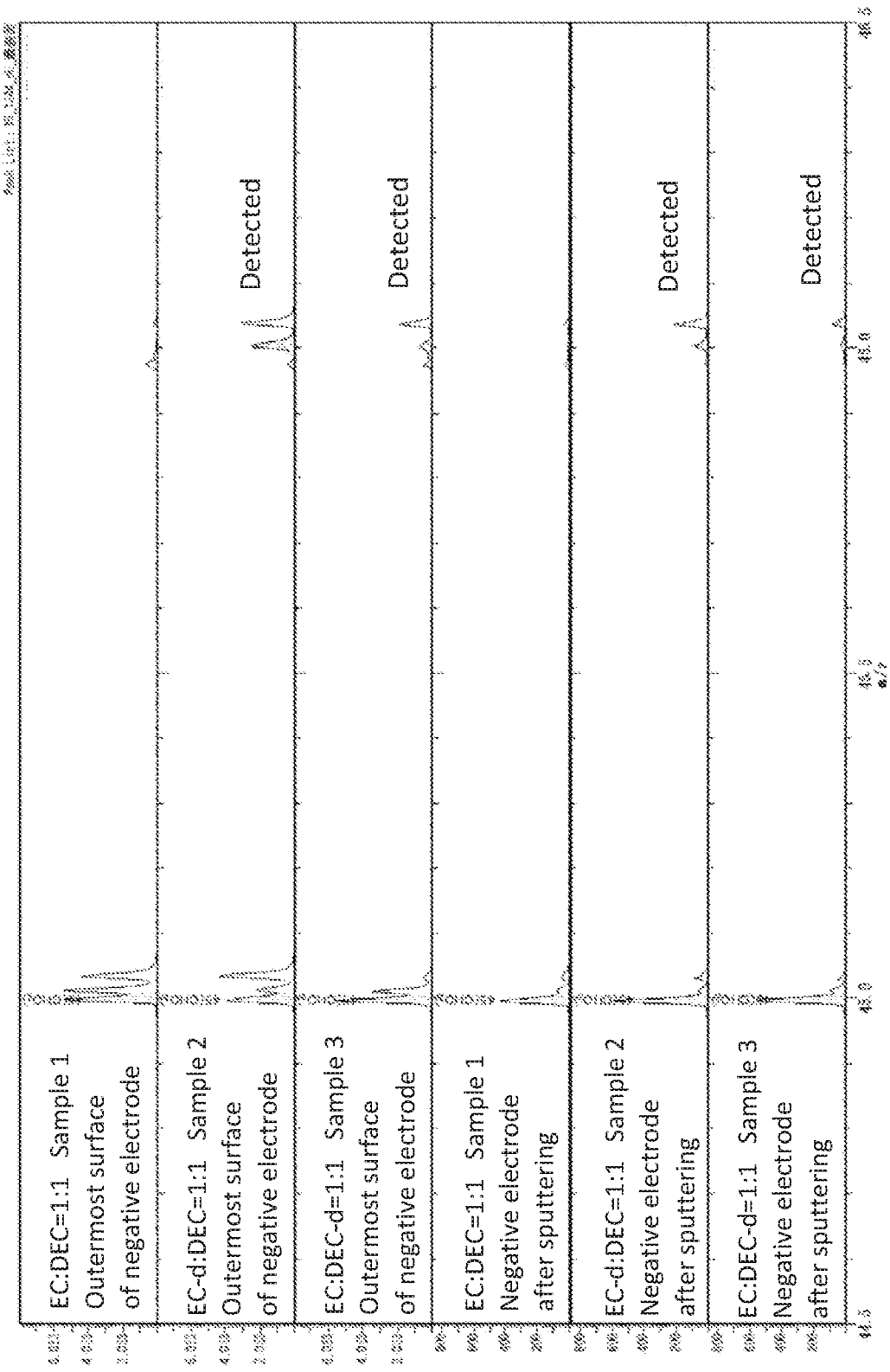
FIG. 17 shows ToF-SIMS analysis results of negative electrodes in Example 1.

FIG. 17 shows ToF-SIMS analysis results of the outermost surface and the surface after sputtering, concerning a fragment ion with a mass of 45, which is presumed to be $CHO_2$, and a fragment ion with a mass of 46, which is presumed to be $CDO_2$, of the negative electrode of each of the samples.

As shown in FIG. 17, a larger amount of $CDO_2$ was detected in the coating film on the negative electrode of Sample 2 including EC-d than in the coating film on the negative electrode of Sample 3 including DEC-d. This indicates that the amount of hydrogen derived from EC is larger than the amount of hydrogen derived from DEC in an organic component of the coating film on the negative electrode.

<<Positive Electrode>>

Figure 18:
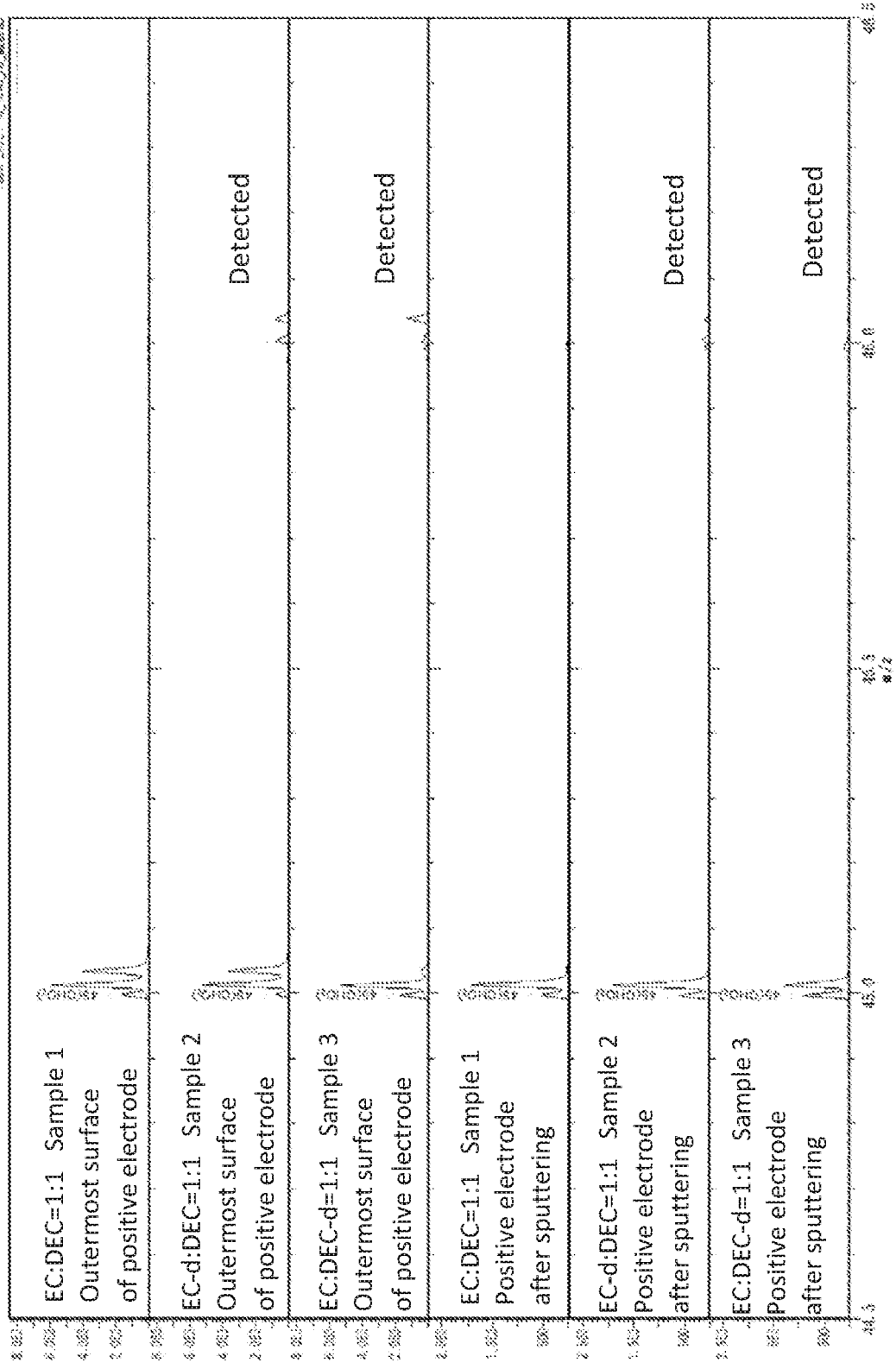
FIG. 18 shows ToF-SIMS analysis results of positive electrodes in Example 1.

FIG. 18 shows ToF-SIMS analysis results of the outermost surface and the surface after sputtering, concerning a fragment ion with a mass of 45, which is presumed to be $CHO_2$, and a fragment ion with a mass of 46, which is presumed to be $CDO_2$, of the positive electrode of each of the samples.

As shown in FIG. 18, the amount of hydrogen derived from EC is larger than the amount of hydrogen derived from DEC in an organic component of the coating film also on the positive electrode.

The above results reveal that most organic components of the coating films on the negative electrode and the positive electrode are composed of decomposition products derived from EC. This is consistent with the LC/MS/MS analysis results of the electrolytic solutions.

Example 2

In this example, EC and DEC were used as solvents of electrolytic solutions in lithium-ion secondary batteries as in Example 1, and three samples, a sample using normal EC and normal DEC, a sample using deuterated EC and normal DEC, and a sample using normal EC and deuterated DEC, were fabricated. The three samples were subjected to an initial charge and discharge process and then gases generated in charge and discharge were analyzed with a gas chromatography-mass spectrometer (GC-MS) and a gas chromatography-thermal conductivity detector (GC-TCD).

Conditions in this example are the same as those in Example 1 except that to ensure a sufficient amount of a gas generated in charge and discharge for analysis, the number of stacked positive electrodes and negative electrodes in a cell was increased and a step of removing the gas was not performed in the initial charge and discharge process.

<Fabrication of Samples for GC-MS and GC-TCD>

Sample 1-GC, Sample 2-GC, and Sample 3-GC were fabricated in the same manner as that of Sample 1, Sample 2, and Sample 3 in Example 1 except that six positive electrodes and six negative electrodes were stacked.

<<Initial Charge and Discharge Process>>

Next, each of the cells of Sample 1-GC. Sample 2-GC, and Sample 3-GC was subjected to an initial charge and discharge process. The initial charge and discharge process is as follows.

1. Charge was performed at 0.01 C up to 15 mAh/g.
2. Charge was performed at 0.1 C up to 120 mAh/g.
3. The cell was kept at 40° C. for 24 hours.
4. Charge was performed at 0.1 C up to 170 mAh/g.
5. CC discharge was performed to 2.5 V at 0.2 C.
6. CCCV charge was performed to 4.3 V at 0.2 C.
7. CC discharge was performed to 2.5 V at 0.2 C.
8. Steps 6 and 7 were repeated twice.

The laminated film in each of Sample 1-GC, Sample 2-GC, and Sample 3-GC subjected to the above initial charge and discharge process was cut and opened in a sampling bag in a glove box, and a gas was collected into the sampling bag. The gas obtained in such a manner is referred to as the gas generated during charge and discharge.

<GC-TCD and GC-MS>

Next, the gas generated during charge and discharge of each of Sample 1-GC, Sample 2-GC, and Sample 3-GC was analyzed with GC-TCD and GC-MS.

GC-TCD analysis conditions are as follows.
Method: GC-TCD
Apparatus: Agilent Technologies 7890A GC System
Inlet temperature: 100° C.
Carrier gas: Ar
GC temperature condition: 35° C. (kept for 20 min.)→5° C./min→60° C. (kept for 30 min.)

GC-MS analysis conditions are as follows.
Method: GC/MS
Apparatus: Agilent Technologies 7890B GC System, Agilent Technologies 5977A MSD
Inlet temperature: 150° C.
Carrier gas: He
Ionization method: EI method
GC temperature increasing condition: 40° C. (kept for 5 min.)→10° C./min→280° C. (kept for 11 min.)

Table 1 lists the existence ratio of gases generated during charge and discharge of Sample 1-GC. Table 2 lists the existence ratio of gases generated during charge and discharge of Sample 2-GC. Table 3 lists the existence ratio of gases generated during charge and discharge of Sample 3-GC.

TABLE 1

| Gas | Keeping time (min) | Existence ratio |
|---|---|---|
| Hydrogen | 1.7 | 26 |
| Oxygen | 2.1 | — |
| Nitrogen | 2.1 | — |
| Carbon monoxide | 2.3 | 15 |
| Methane | 3.7 | 3 |
| Carbon dioxide | 13.3 | 6 |
| Ethylene | 34.1 | 46 |
| Ethane | 44.6 | 4 |

TABLE 2

| Gas | Keeping time (min) | Existence ratio |
|---|---|---|
| Hydrogen | 1.7 | 33 |
| Oxygen | 2.1 | — |
| Nitrogen | 2.1 | — |
| Carbon monoxide | 2.4 | 14 |
| Methane | 3.7 | 3 |
| Carbon dioxide | 13.7 | 3 |
| Ethylene | 33.9 | 42 |
| Ethane | 45.0 | 5 |

TABLE 3

| Gas | Keeping time (min) | Existence ratio |
|---|---|---|
| Hydrogen | 1.7 | 27 |
| Oxygen | 2.1 | — |
| Nitrogen | 2.1 | — |
| Carbon monoxide | 2.4 | 10 |
| Methane | 3.7 | 3 |
| Carbon dioxide | 13.4 | 6 |
| Ethylene | 35.7 | 49 |
| Ethane | 42.8 | 5 |

Table 4 lists the detection degrees of methane, ethylene, and ethane, which are gas components containing heavy hydrogen based on Tables 1 to 3. In the table, a double circle represents a gas that is detected in the highest amount, a circle represents a gas that is detected, a triangle represents a gas that is presumably detected in a slight amount, and a hyphen represents no detection.

TABLE 4

| Gas | Sample 1-GC EC:DEC = 1:1 | Sample 2-GC EC-d:DEC = 1:1 | Sample 3-GC EC:DEC-d = 1:1 |
|---|---|---|---|
| Methane | ◎ | ○ | ◎ |
| Methane-$d_1$ | — | ◎ | ○ |
| Methane-$d_2$ | — | ○ | — |
| Methane-$d_3$ | — | ○ | — |
| Methane-$d_4$ | — | △ | — |
| Ethylene | ◎ | — | ◎ |
| Ethylene-$d_4$ | — | ◎ | △ |
| Ethane | ◎ | ◎ | ○ |
| Ethane-$d_1$ | — | ○ | — |
| Ethane-$d_2$ | — | ○ | — |
| Ethane-$d_3$ | — | ○ | ◎ |
| Ethane-$d_4$ | — | ○ | △ |

Although deuterated ethylene was detected in both Sample 2-GC and Sample 3-GC as shown in Tables 1 to 4, it was more noticeably detected in Sample 2-GC than in Sample 3-GC. This implies that a main generation source of ethylene is EC.

Although deuterated ethane was detected in both Sample 2-GC and Sample 3-GC, it was more noticeably detected in Sample 3-GC than in Sample 2-GC. This implies that a main generation source of ethane is DEC.

Example 3

In this example, to acquire more detailed information about formation of coating films in the case where a different electrolyte is dissolved in an electrolytic solution, an experiment was performed in the same manner as that in Example 1 except that 1.0 mol/L of $LiPF_6$ was used as an electrolyte of an electrolytic solution. As in Example 1, a decomposition product in the electrolytic solution and coating films on a positive electrode and a negative electrode were analyzed by LC/MS/MS and ToF-SIMS.

<Fabrication of Samples>

$LiPF_6$ was used as an electrolyte of an electrolytic solution in each of Sample 4, Sample 5, and Sample 6. Measurement was performed such that the concentration of $LiPF_6$ was 1.0 mol/L.

The ratios of solvents of the electrolytic solutions in Sample 4, Sample 5, and Sample 6 are as follows.
Sample 4: EC:DEC=1:1 (volume ratio)
Sample 5: EC-d:DEC=1:1 (volume ratio)
Sample 6: EC:DEC-d=1:1 (volume ratio)

A cell of each of the samples was fabricated in the same manner as that in Example 1 except in the electrolyte and subjected to an initial charge and discharge process while being pressurized.

The laminated film in each of Sample 4, Sample 5, and Sample 6 subjected to the initial charge and discharge process was cut and opened in a glove box, acetonitrile was injected to the electrolytic solution, and the mixture was extracted. Then, the negative electrode and the positive electrode were taken out, washed with acetonitrile and dimethyl carbonate (DMC), and dried. The electrolytic solution obtained through the above steps is referred to as an electrolytic solution after charge and discharge. The negative electrode and the positive electrode obtained through the above steps are referred to as the negative electrode after charge and discharge and the positive electrode after charge and discharge, respectively.

<LC/MS/MS>

The electrolytic solution after charge and discharge and the electrolytic solution before charge and discharge in each of Sample 4, Sample 5, and Sample 6 were analyzed by LC/MS/MS as in Example 1.

Figure 19:
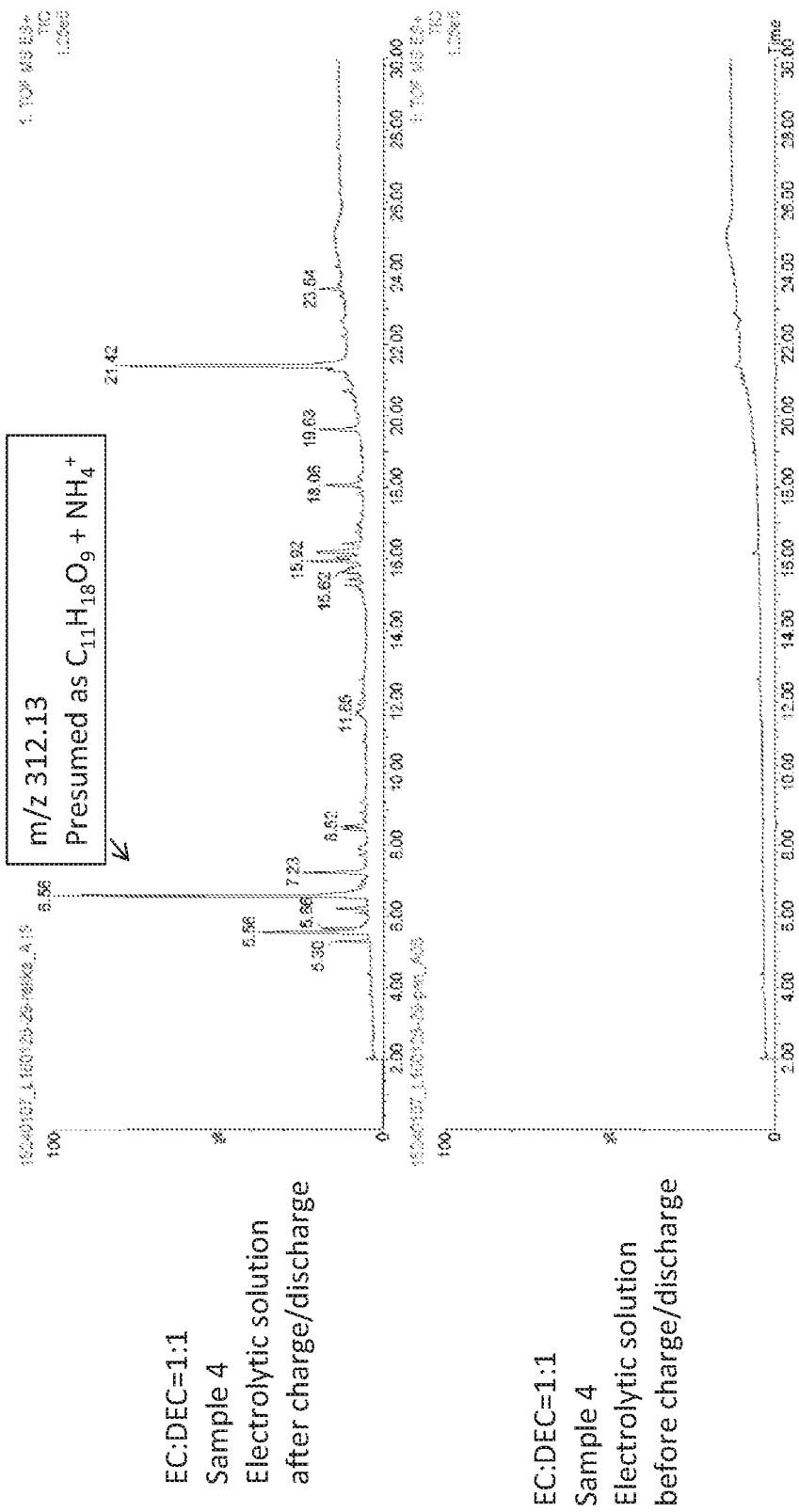
FIG. 19 shows TICs of LC/MS/MS analysis of Sample 4 in Example 3.
Figure 20:
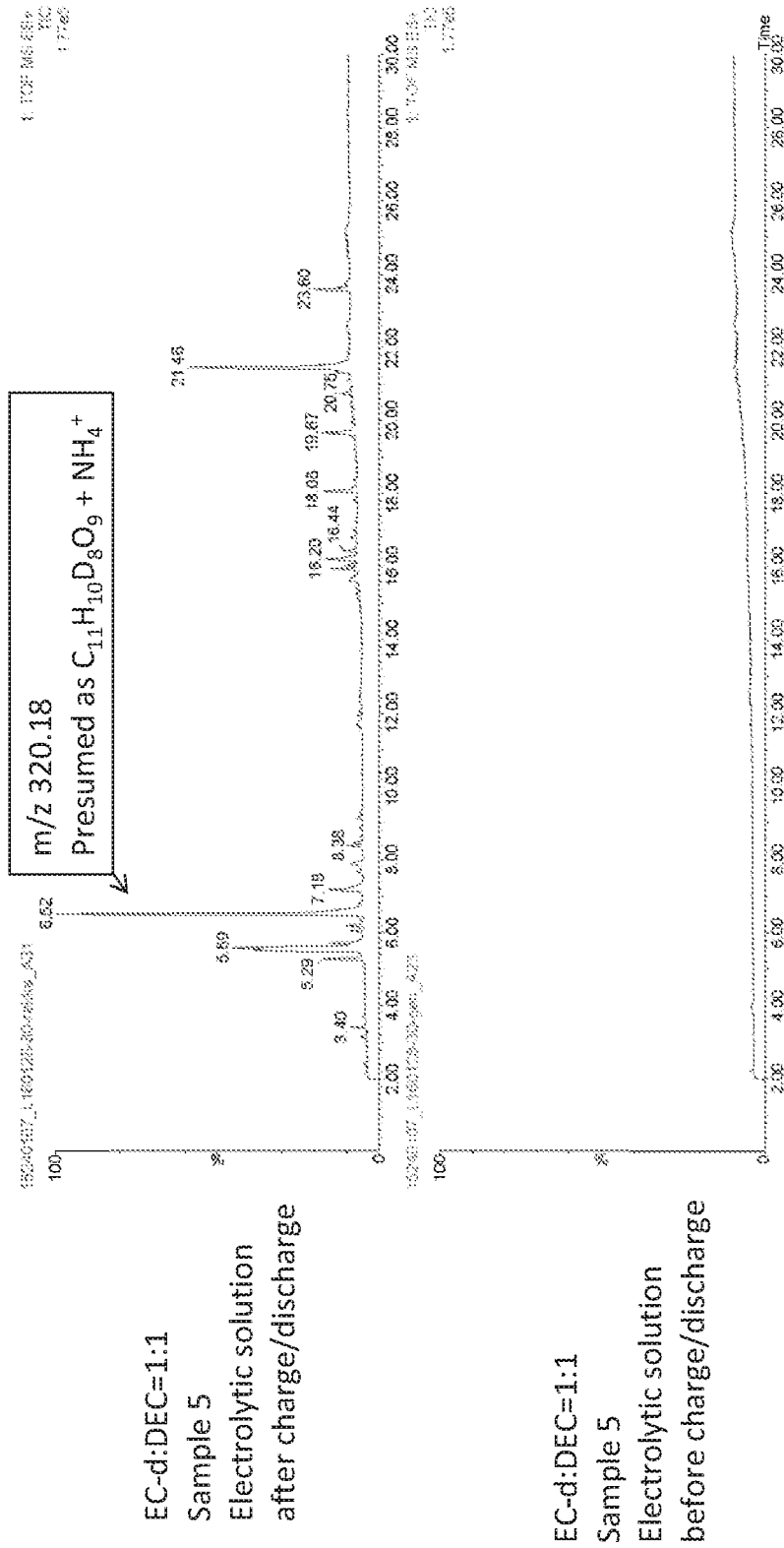
FIG. 20 shows TICs of LC/MS/MS analysis of Sample 5 in Example 3.
Figure 21:
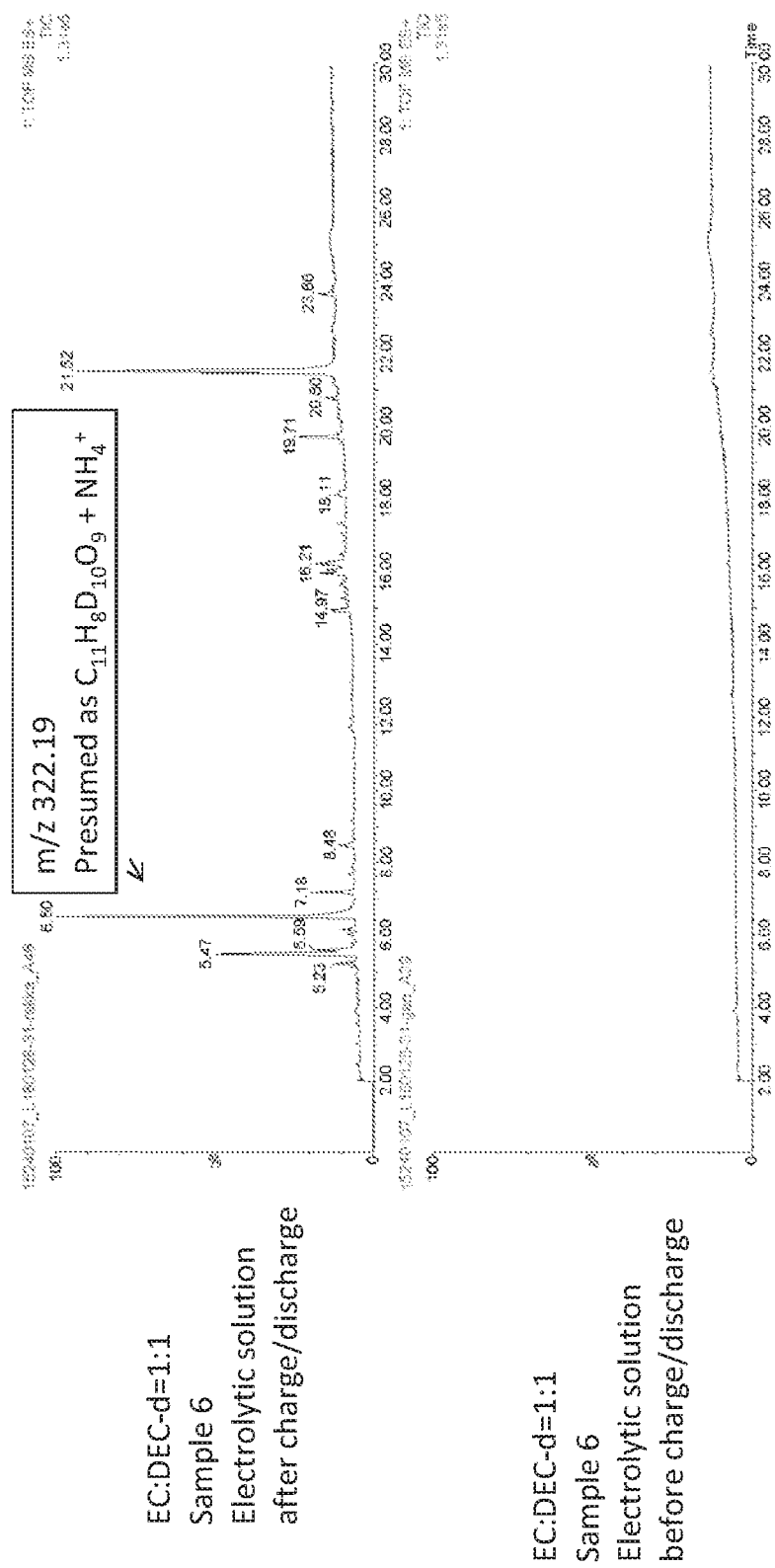
FIG. 21 shows TICs of LC/MS/MS analysis of Sample 6 in Example 3.

FIG. 19 shows TICs of the electrolytic solution after charge and discharge and the electrolytic solution before charge and discharge of Sample 4. FIG. 20 shows TICs of the electrolytic solution after charge and discharge and the electrolytic solution before charge and discharge of Sample 5. FIG. 21 shows TICs of the electrolytic solution after charge and discharge and the electrolytic solution before charge and discharge of Sample 6.

In FIG. 19, FIG. 20, and FIG. 21, the mass and presumed structural formula of a significantly clearly observed decomposition product with a relatively low molecular weight that is contained in each of the electrolytic solutions after charge and discharge and kept for longer than or equal to 5 minutes and shorter than or equal to 8 minutes are shown. The decomposition products with a low molecular weight included in Sample 4, Sample 5, and Sample 6 are the same as those included in Sample 1, Sample 2, and Sample 3, respectively.

The above results suggest that also in the case where a different electrolyte was dissolved in the electrolytic solution, each of the decomposition products with a relatively low molecular weight that was kept for longer than or equal to 5 minutes and shorter than or equal to 8 minutes is straight-chain, carbon, hydrogen, and oxygen at both ends of a molecule are derived from DEC, and carbon, hydrogen, and oxygen at the center of the molecule are derived from EC.

<ToF-SIMS>

Next, the surface of the negative electrode after charge and discharge and the surface of the positive electrode after charge and discharge of each of Sample 4, Sample 5, and Sample 6 were analyzed by ToF-SIMS as in Example 1.

<<Negative Electrode>>

Figure 22:
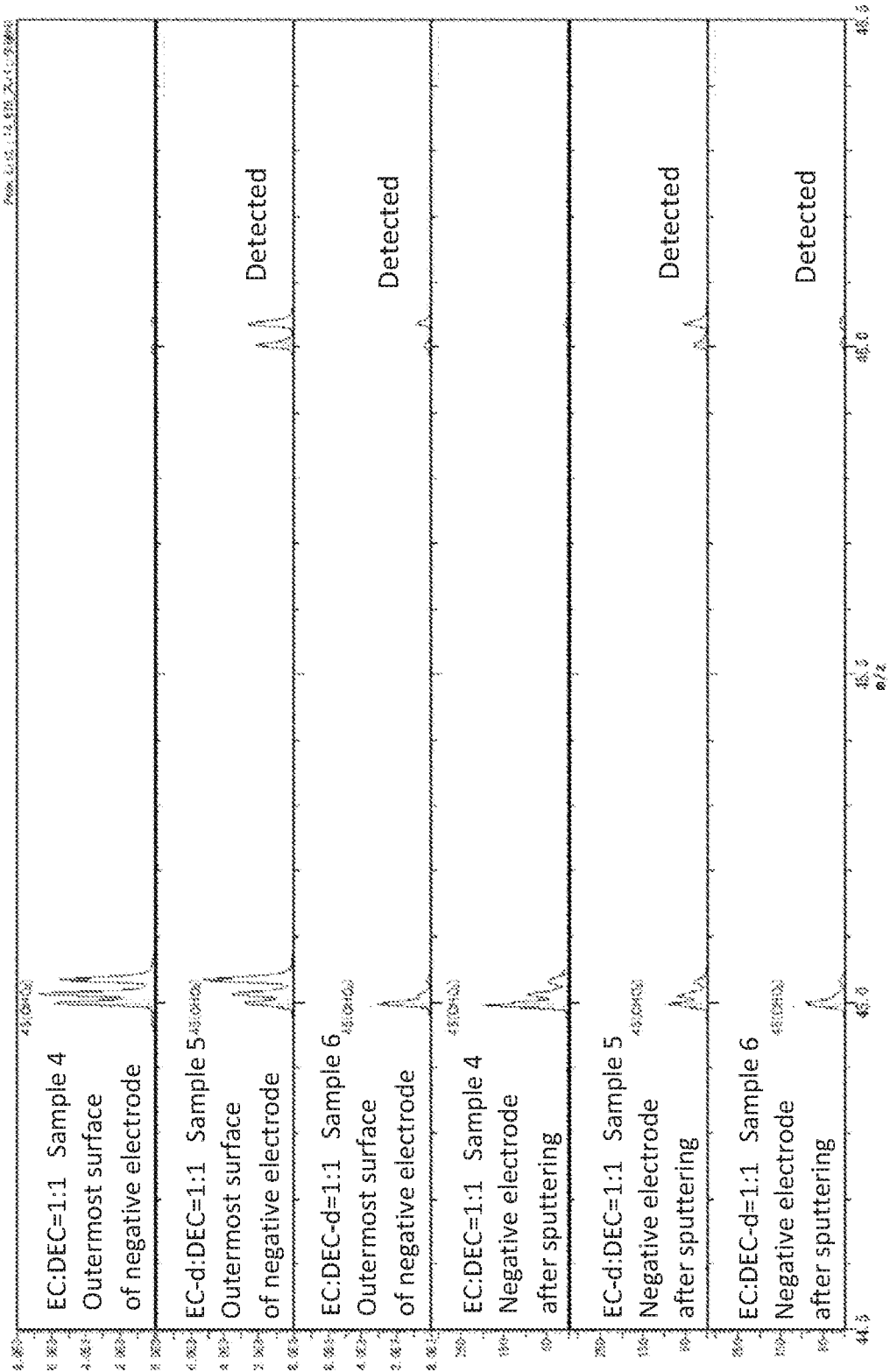
FIG. 22 shows ToF-SIMS analysis results of negative electrodes in Example 3.

FIG. 22 shows ToF-SIMS analysis results of the outermost surface and the surface after sputtering, concerning a fragment ion with a mass of 45, which is presumed to be $CHO_2$, and a fragment ion with a mass of 46, which is presumed to be $CDO_2$, of the negative electrode of each of the samples.

As shown in FIG. 22, a larger amount of $CDO_2$ was detected in the coating film on the negative electrode of Sample 6 including EC-d than in the coating film on the negative electrode of Sample 5 including DEC-d. This indicates that the amount of hydrogen derived from EC is larger than the amount of hydrogen derived from DEC in an organic component of the coating film on the negative electrode.

<<Positive Electrode>>

FIG. 23 shows ToF-SIMS analysis results of the outermost surface and the surface after sputtering, concerning a fragment ion with a mass of 45, which is presumed to be $CHO_2$, and a fragment ion with a mass of 46, which is presumed to be $CDO_2$, of the positive electrode of each of the samples.

As shown in FIG. 23, the amount of hydrogen derived from EC is larger than the amount of hydrogen derived from DEC in an organic component of the coating film also on the positive electrode.

The above results reveal that also in the case where a different electrolyte was dissolved in the electrolytic solution, most organic components of the coating films on the negative electrode and the positive electrode are composed of decomposition products derived from EC.

Example 4

In this example, to acquire more detailed information about formation of coating films in the case where a different electrolyte is dissolved in an electrolytic solution, each sample was fabricated using 1.0 mol/L of $LiPF_6$ as an electrolyte of an electrolytic solution as in Example 3. The sample was subjected to an initial charge and discharge process and then gases generated in charge and discharge were analyzed with a GC-MS and a GC-TCD.

Conditions in this example are the same as those in Example 3 except that to ensure a sufficient amount of a gas generated in charge and discharge, the number of stacked positive electrodes and negative electrodes in a cell was increased and a step of removing the gas was not performed in the initial charge and discharge process.

<Fabrication of Samples for GC-MS and GC-TCD>

Sample 4-GC, Sample 5-GC, and Sample 6-GC were fabricated in the same manner as that of Sample 4, Sample 5, and Sample 6 in Example 3 except that six positive electrodes and six negative electrodes were stacked.

<<Initial Charge and Discharge Process>>

Next, each of the cells of Sample 4-GC, Sample 5-GC, and Sample 6-GC was subjected to an initial charge and discharge process. The initial charge and discharge process was performed in the same manner as that in Example 2.

The laminated film in each of Sample 4-GC. Sample 5-GC, and Sample 6-GC subjected to the above initial charge and discharge process was cut and opened in a sampling bag in a glove box, and a gas was collected into the sampling bag. The gas obtained in such a manner is referred to as the gas generated during charge and discharge.

<GC-TCD and GC-MS>

The gas generated during charge and discharge of each of Sample 4-GC, Sample 5-GC, and Sample 6-GC were analyzed with GC-TCD and GC-MS in the manner.

Table 5 lists the existence ratio of gases generated during charge and discharge of Sample 4-GC. Table 6 lists the existence ratio of gases generated during charge and discharge of Sample 5-GC. Table 7 lists the existence ratio of gases generated during charge and discharge of Sample 6-GC.

TABLE 5

| Gas | Keeping time (min) | Existence ratio |
|---|---|---|
| Hydrogen | 1.7 | 28 |
| Oxygen | 2.1 | — |
| Nitrogen | 2.1 | — |
| Carbon monoxide | 2.3 | 16 |
| Methane | 3.7 | 4 |
| Carbon dioxide | 13.5 | 5 |
| Ethylene | 34.4 | 43 |
| Ethane | 44.7 | 5 |

TABLE 6

| Gas | Keeping time (min) | Existence ratio |
|---|---|---|
| Hydrogen | 1.7 | 33 |
| Oxygen | 2.1 | — |
| Nitrogen | 2.1 | — |
| Carbon monoxide | 2.3 | 15 |
| Methane | 3.7 | 4 |
| Carbon dioxide | 13.6 | 1 |
| Ethylene | 33.4 | 41 |
| Ethane | 44.7 | 5 |

TABLE 7

| Gas | Keeping time (min) | Existence ratio |
|---|---|---|
| Hydrogen | 1.7 | 32 |
| Oxygen | 2.1 | — |
| Nitrogen | 2.1 | — |
| Carbon monoxide | 2.3 | 13 |
| Methane | 3.7 | 9 |
| Carbon dioxide | 13.4 | 4 |
| Ethylene | 34.5 | 35 |
| Ethane | 44.9 | 7 |

Table 8 lists the detection degrees of methane, ethylene, and ethane, which are gas components containing heavy hydrogen based on Tables 5 to 7. In the table, a double circle represents a gas that is detected in the highest amount, a circle represents a gas that is detected, a triangle represents a gas that is presumably detected in a slight amount, and a hyphen represents no detection.

TABLE 8

| Gas | Sample 4-GC EC:DEC = 1:1 | Sample 5-GC EC-d:DEC = 1:1 | Sample 6-GC EC:DEC-d = 1:1 |
|---|---|---|---|
| Methane | ◎ | ○ | ◎ |
| Methane-$d_1$ | — | ◎ | ○ |
| Methane-$d_2$ | — | ○ | △ |
| Methane-$d_3$ | — | ○ | △ |
| Methane-$d_4$ | — | △ | — |
| Ethylene | ◎ | — | ◎ |
| Ethylene-$d_1$ or $d_3$ | — | △ | △ |
| Ethylene-$d_4$ | — | ◎ | △ |
| Ethane | ◎ | ◎ | ○ |
| Ethane-$d_4$ | — | ○ | — |
| Ethane-$d_5$ | — | ○ | ◎ |
| Ethane-$d_6$ | — | ○ | △ |

As shown in Tables 5 to 8, also in the case where the electrolyte dissolved in the electrolytic solution is different, a main generation source of ethylene is presumed to be EC and a main generation source of ethane is presumed to be DEC.

Example 5

In this example, to acquire more detailed information about decomposition of an electrolytic solution and formation of coating films accompanying the decomposition of the electrolytic solution, cells with different mixing ratios of solvents of electrolytic solutions were analyzed for comparison.

Specifically, EC and DEC were used as solvents of electrolytic solutions in lithium-ion secondary batteries, and three samples with different mixing ratios of EC and DEC were fabricated. The three samples were subjected to an initial charge and discharge process and then decomposition products of the electrolytic solutions were analyzed. For the analysis, LC/MS/MS was employed.

<Fabrication of Samples>

$LiPF_6$ was used as an electrolyte of an electrolytic solution in each of Sample 7, Sample 8, and Sample 9. Measurement was performed such that the concentration of $LiPF_6$ was 1.0 mol/L.

Next, EC and DEC as the solvents of the electrolytic solutions in the samples were measured. $LiPF_6$, LiFSA, and EC were mixed into DEC and the mixture was stirred so that $LiPF_6$, LiFSA, and EC were dissolved in DEC. The ratios of the solvents of the electrolytic solutions are as follows.

Sample 7: EC:DEC=2:8 (volume ratio) (comparative example)
Sample 8: EC:DEC=8:2 (volume ratio)
Sample 9: EC:DEC=5:5 (volume ratio)

The cell of each of the samples was fabricated in the same manner as that in Example 1 except in the mixing ratio of the solvents.

<Charge and Discharge>

Next, each of the cells of Sample 7, Sample 8, and Sample 9 fabricated in the aforementioned manner was subjected to one cycle of charge and discharge. The charge and discharge process is as follows.
1. CCCV charge was performed to 4.3 V at 0.01 C.
2. CC discharge was performed to 2.5 V at 0.1 C.

The laminated film in each of Sample 7, Sample 8, and Sample 9 subjected to the above charge and discharge process was cut and opened in a glove box, acetonitrile was injected to the electrolytic solution, and the mixture was extracted. The electrolytic solution obtained through the above steps is referred to as an electrolytic solution after charge and discharge.

<LC/MS/MS>

The electrolytic solution after charge and discharge of each of Sample 7, Sample 8, and Sample 9 was analyzed by LC/MS/MS. The analysis conditions are the same as those in Example 1.

FIG. 24 shows total ion chromatograms (TICs) of the electrolytic solutions after charge and discharge of Sample 7, Sample 8, and Sample 9.

As shown in FIG. 24, in Sample 7, the content of decomposition products with a relatively low molecular weight in the electrolytic solution after charge and discharge that was kept for longer than or equal to 5 minutes and shorter than or equal to 8 minutes is high, whereas in each of Sample 8 and Sample 9, that in the electrolytic solution after charge and discharge that was kept for longer than or equal to 5 minutes and shorter than or equal to 8 minutes is low.

The above results reveal that when the EC content in the electrolytic solution is higher than 50 vol %, generation of decomposition products with a relatively low molecular weight can be reduced.

To form stable coating films on surfaces of a negative electrode and a positive electrode of a lithium-ion secondary battery, it is preferred that the content of decomposition products with a low molecular weight be low and the content of decomposition products with a high molecular weight be high. This is because decomposition products with a low molecular weight easily dissolve in an electrolytic solution and such decomposition products dissolving in the electrolytic solution do not form coating films.

Thus, it is effective to set the content of EC among solvents in an electrolytic solution to higher than 50 vol % so that a stable coating film is formed on a surface of a negative electrode or a positive electrode of a lithium-ion secondary battery negative electrode.

Example 6

In this example, based on the findings produced in Examples 1 to 5, lithium-ion secondary batteries in each of which stable coating films were formed on surfaces of a negative electrode and a positive electrode were fabricated and the cycle performances thereof were evaluated.

Specifically, as a first solvent, a second solvent, and a third solvent in a first electrolytic solution of each of the lithium-ion secondary batteries, EC, DEC, and EMC were used, respectively. An initial charge and discharge process was started with the EC content in the first electrolytic solution set to higher than 50 vol %, and stable coating films were formed on the surfaces of the negative electrode and the positive electrode. After that, an exterior body was opened and an electrolytic solution with a viscosity lower than that of EC was added to the first electrolytic solution so that the EC content in a second electrolytic solution finally obtained after completion of the initial charge and discharge process was 40 vol % or less. As the electrolytic solution with a viscosity lower than that of EC, EMC alone or EMC and VC were used.

<Fabrication of Samples>

$LiPF_6$ and LiFSA were used as electrolytes of electrolytic solutions in both of Sample 10 and Sample 11. Measurement was performed such that the concentration of $LiPF_6$ was 1.1 mol/L and the concentration of LiFSA was 0.6 mol/L.

The ratios of the solvents of the first electrolytic solutions in Sample 10 and Sample 11 are as follows.
Sample 1: EC:DEC:EMC=7:1.5:1.5 (volume ratio)

A cell of each of the samples was fabricated in the same manner as that in Example 1 except in the electrolytic solution. Assume that the number of samples of the same condition n is two.

<Initial Charge and Discharge Process>

Next, each of Sample 10 and Sample 11 fabricated in the aforementioned manner was subjected to an initial charge and discharge process. The initial charge and discharge process is as follows.
1. Charge was performed at 0.01 C up to 25 mAh/g.
2. A laminated film was cut and opened and then the cell was pressurized by hand to remove a gas from the cell.
3. An electrolytic solution was additionally injected. The electrolytic solution additionally injected in each of the samples will be described later.
4. The laminated film was sealed by thermal welding.
5. Charge was performed at 0.1 C up to 120 mAh/g.
6. The cell was kept at 40° C. for 24 hours.
7. The laminated film was cut and opened and then the cell was pressurized with a roller to remove a gas from the cell.
8. The laminated film was sealed by thermal welding.
9. Charge was performed at 0.1 C up to 170 mAh/g.
10. CC discharge was performed to 2.5 V at 0.2 C.
11. CCCV charge was performed to 4.3 V at 0.2 C.
12. CC discharge was performed to 2.5 V at 0.2 C.
13. Steps 11 and 12 were repeated twice.

The electrolytic solutions additionally injected in the samples in Step 3 of the initial charge and discharge process are as follows.
Sample 10: EMC
Sample 11: EMC and VC As a result of Step 3, the following second electrolytic solutions were obtained.

Sample 10: 0.57 mol/L of LiPF$_6$, 0.31 mol/L of LiFSA, EC:DEC:EMC=3.6:0.8:5.3 (volume ratio)

Sample 11: 0.55 mol/L of LiPF$_6$, 0.3 mol/L of LiFSA, EC:DEC:EMC:VC=3.4:0.7:5.8:0.05 (volume ratio)

Chemical Formulae 7 show the structural formulae of EC, DEC, EMC, and VC used in Sample 10 and Sample 11.

[Chemical Formulae 7]

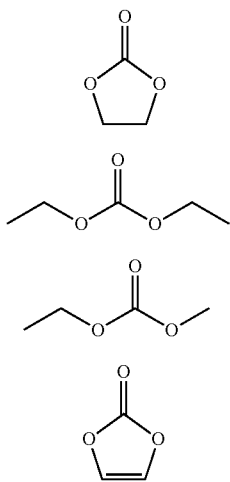

Note that the charging steps and the discharging steps such as Step 1, Step 5, and Steps 9 to 13 in the initial charge and discharge process were performed with the cell pressurized with the pressurizing instrument as in Example 1.

The cycle performances of Sample 10 and Sample 11 after the initial charge and discharge process were evaluated. Note that charge and discharge for evaluation of cycle performance were performed with the cell not pressurized.

Figure 25A:
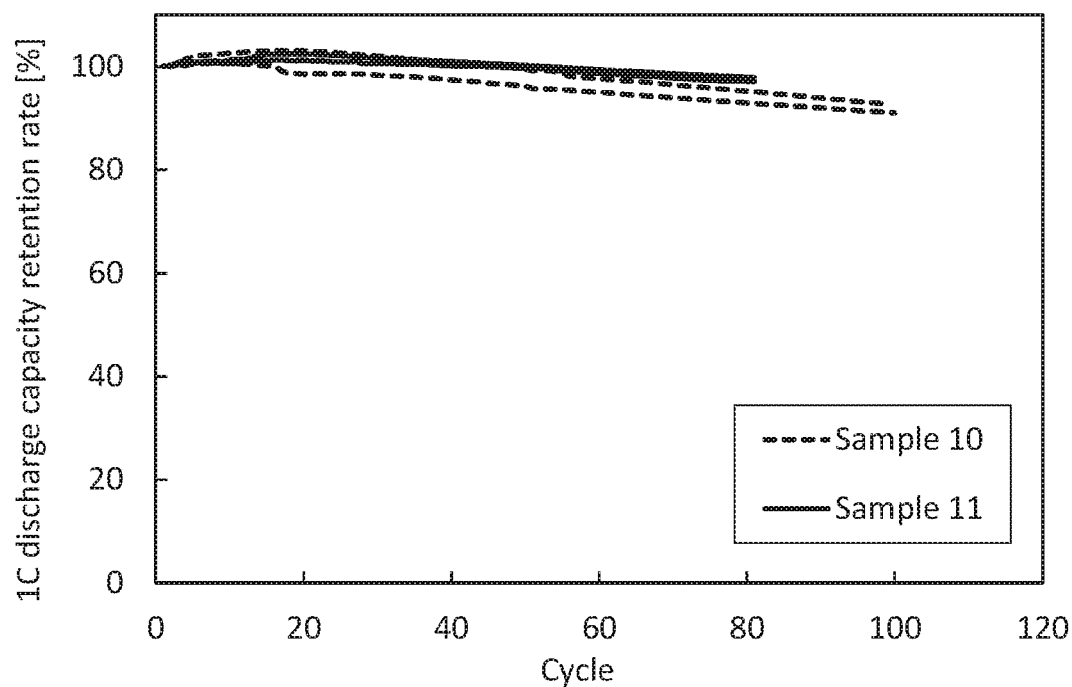
FIGS. 25A and 25B are graphs each showing the cycle performances of Sample and Sample 11 in Example 6.
Figure 25B:
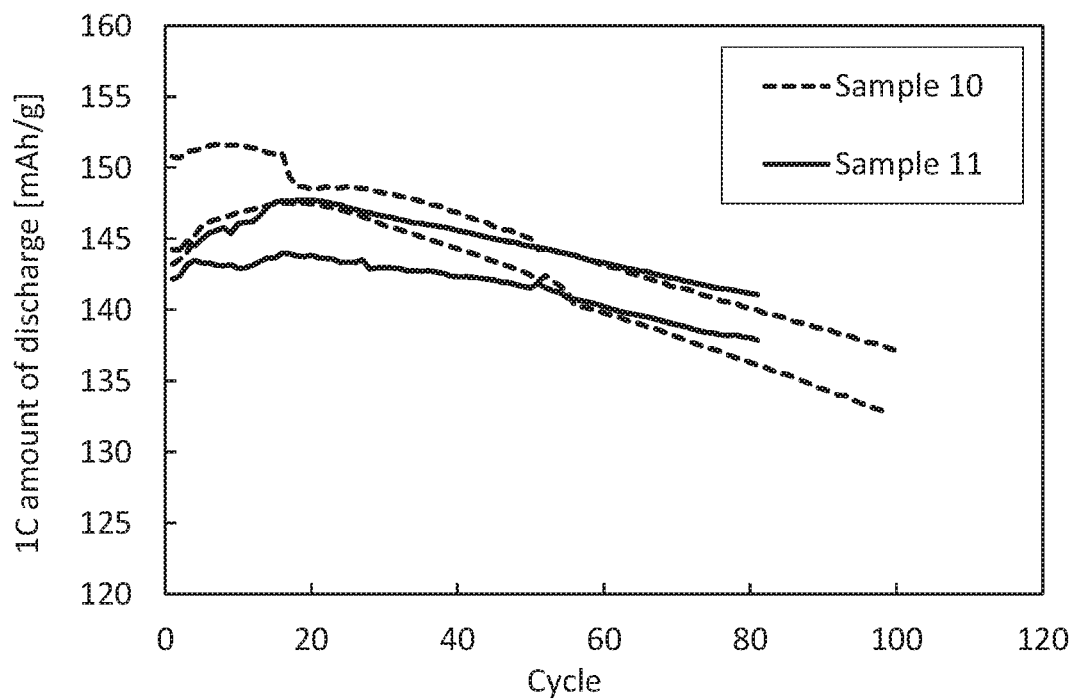

FIG. 25A shows the discharge capacity retention rates of Sample 10 and Sample S11, and FIG. 25B shows the discharge capacities of Sample 10 and Sample 11. The broken line and the solid line in each graph represent Sample 10 and Sample 11, respectively.

As shown by the results of Sample 10 in the graphs of FIGS. 25A and 25B, the lithium-ion secondary battery with excellent cycle performance was able to be fabricated in such a manner that the initial charge and discharge process was started with the EC content as a solvent in the electrolytic solution of the lithium-ion secondary battery set to higher than 50 vol % first, and after a stable coating film derived from EC was formed on the surface of the negative electrode or the positive electrode, an exterior body was opened and another electrolytic solution with a viscosity lower than that of EC was added to the electrolytic solution. Reducing the proportion of a chain carbonate of solvents presumably allows a chain reaction of decomposition of EC to continue for a long time in an early stage of formation of the coating film, resulting in formation of the favorable coating film derived from EC.

Furthermore, as shown by the results of Sample 11 in the graphs of FIGS. 25A and 25B, adding VC, which has a lower viscosity than EC, enabled fabrication of the lithium-ion secondary battery with more excellent cycle performance.

Example 7

In this example, based on the findings produced in Examples 1 to 5, lithium-ion secondary batteries in each of which stable coating films were formed on surfaces of a negative electrode and a positive electrode and that are different from those in Example 6 were fabricated and the cycle performances thereof were evaluated.

Specifically, as a first solvent and a second solvent in a first electrolytic solution of Sample 12, EC and DEC were used, respectively. First, an initial charge and discharge process was started with the EC content in the first electrolytic solution set to higher than 70 vol %, and stable coating films were formed on the surfaces of the negative electrode and the positive electrode. After that, an exterior body was opened and EMC was added as a third solvent to the first electrolytic solution so that the content of EC among solvents in a second electrolytic solution was 60 vol % or less.

In Sample 13 as a comparative example, an electrolytic solution that contains EMC from the beginning as well as EC and DEC and in which the EC content is 50 vol % or less was used. Like Sample 12. Sample 13 was subjected to the initial charge and discharge process and then an exterior body was opened, but no solvent was added.

Then, the cycle performances of Sample 12 and Sample 13 were evaluated.

Note that in this example, reagents produced by Kishida Chemical Co., Ltd. were used as EC, DEC, EMC, LiPF$_6$, and LiFSA.

<Fabrication of Sample 12>

First, the details of Sample 12 will be described below. As electrolytes of Sample 12, LiPF$_6$ and LiFSA were used. As the solvents of the first electrolytic solution, EC and DEC were used.

First, LiPF$_6$, LiFSA, EC, and DEC, which were used for the first electrolytic solution, were measured. Then, LiPF$_6$, LiFSA, and EC were mixed into DEC and the mixture was stirred so that LiPF$_6$, LiFSA, and EC were dissolved in DEC to prepare the first electrolytic solution containing 0.9 mol/L of LiPF$_6$ and 0.6 mol/L of LiFSA.

The ratio of the solvents of the first electrolytic solution in Sample 12 is as follows.

EC:DEC=8:2 (volume ratio)

Materials other than the above are as follows: LiCoO$_2$ was used as a positive electrode active material included in a positive electrode active material layer; acetylene black (AB) was used as a positive electrode conductive additive; polyvinylidene fluoride (PVDF) was used as a positive electrode binder; 20-μm-thick aluminum foil was used as a positive electrode current collector; graphite was used as a negative electrode active material included in a negative electrode active material layer: carboxymethylcellulose (CMC) and styrene-butadiene rubber (SBR) were used as negative electrode binders; 18-μm-thick copper foil was used as a negative electrode current collector: 25-μm-thick polypropylene was used as a separator; and a 113-μm-thick laminated film including aluminum foil was used as an exterior body.

The positive electrode was fabricated in such a manner that a slurry formed by mixing the positive electrode active material, the positive electrode conductive additive, and the positive electrode binder with N-methyl-2-pyrrolidone (NMP) was applied to the positive electrode current collector to form the positive electrode active material layer, drying was performed, and punching was performed to obtain a predetermined shape. The area of a region of the positive electrode current collector to which the positive electrode active material was applied is 20.5 cm$^2$. The negative electrode was fabricated in such a manner that a slurry formed by mixing the negative electrode active material and the negative electrode binders with water was applied to the negative electrode current collector to form the negative electrode active material layer, drying was performed, and punching was performed to obtain a predetermined shape. The area of a region of the negative electrode current collector to which the negative electrode active material was applied is 23.8 cm$^2$.

Then, the positive electrode, the separator, and the negative electrode were stacked and covered with the laminated film, the first electrolytic solution of the above condition was injected in the sample cell, and the laminated film was sealed by thermal welding, so that the cell of Sample 12 was fabricated. The thickness of each of the cells is approximately 0.45 mm.

<<Initial Charge and Discharge Process>>

The cell of Sample 12 was subjected to an initial charge and discharge process. The initial charge and discharge process is as follows.

1. Charge was performed at 0.01 C up to 15 mAh/g.
2. The laminated film was cut and opened and EMC was added. Then, the cell was pressurized by hand to remove a gas from the cell.
3. The laminated film was sealed by thermal welding.
4. Charge was performed at 0.1 C up to 120 mAh/g.
5. The cell was kept at 40° C. for 24 hours.
6. The laminated film was cut and opened and then the cell was pressurized by hand to remove a gas from the cell.
7. The laminated film was sealed by thermal welding.
8. CCCV charge was performed to 4.3 V at 0.1 C.
9. CC discharge was performed to 2.5 V at 0.2 C.
10. CCCV charge was performed to 4.3 V at 0.2 C.
11. CC discharge was performed to 2.5 V at 0.2 C.
12. Steps 10 and 11 were repeated twice.

The ratio of the solvents of the second electrolytic solution in Sample 12 is as follows.
EC:DEC:EMC=5:1:4 (volume ratio)

Note that in this specification and the like, the amount of charge in the initial charge and discharge process, for example, the amount of charge in each of Step 1 and Step 4 is the amount of charge per gram of the positive electrode active material. The term "full charge" means the state where charge at a voltage controlled to be 4.3 V to a current value of 0.01 C is completed.

Note that the charging steps and the discharging steps such as Step 1, Step 4, and Steps 6 to 10 in the initial charge and discharge process were performed with the cell pressurized. The pressure was applied with the cell sandwiched by a pressurizing instrument so that the positive electrode and the negative electrode included in the cell were evenly pressurized.

Pressurizing the cell can inhibit a phenomenon in which a negative electrode active material is separated from a negative electrode current collector in charge. Furthermore, the gas contained in the electrolytic solution and the gas generated by the decomposition of the electrolytic solution can be prevented from remaining between the positive electrode and the negative electrode and inhibiting charge and discharge.

Furthermore, pressurizing the cell can reduce the distance between the positive electrode and the negative electrode included in the cell. When the content of EC as a solvent in the first electrolytic solution is high as in this example, the viscosity of the electrolytic solution is high and thus lithium-ion transfer between the electrodes might be difficult; however, a reduction in the distance between the positive electrode and the negative electrode can lower the resistance of the cell.

Moreover, pressurizing the cell can inhibit formation of roughness of the positive electrode and the negative electrode. Formation of roughness of the positive electrode and the negative electrode generates variations in the distance between the positive electrode and the negative electrode in the cell. Thus, when the positive electrode and the negative electrode have roughness, lithium ions might concentrate in a region where the distance between the positive electrode and the negative electrode is short, easily causing lithium deposition on the negative electrode. However, pressurizing the cell to inhibit formation of roughness can prevent lithium deposition, resulting in an increase in the safety of the cell.

In this example, the pressurizing instrument illustrated in FIGS. 5A and 5B was used. Bolts and nuts as the fixing instrument 15a and the fixing instrument 15b and washers were fixed with a torque wrench. The torque was specified to be 0.1 N·m. As a cushioning, a rubber plate with a hardness of 50° was used.

<Fabrication of Sample 13>

Next, the details of Sample 13 will be described below.

The ratio of the solvents of the electrolytic solution of Sample 13 is as follows. EC:DEC:EMC=5:1:4 (volume ratio)

Sample 13 was fabricated in the same manner as that of Sample 12 except in the solvents of the electrolytic solution.

<<Initial Charge and Discharge Process>>

Next, Sample 13 was subjected to an initial charge and discharge process. The initial charge and discharge process is as follows.

1. Charge was performed at 0.01 C up to 15 mAh/g.
2. A laminated film was cut and opened and then the cell was pressurized by hand to remove a gas from the cell.
3. The laminated film was sealed by thermal welding.
4. Charge was performed at 0.1 C up to 120 mAh/g.
5. The cell was kept at 40° C. for 24 hours.
6. The laminated film was cut and opened and then the cell was pressurized by hand to remove a gas from the cell.
7. The laminated film was sealed by thermal welding.
8. CCCV charge was performed to 4.3 V at 0.1 C.
9. CC discharge was performed to 2.5 V at 0.2 C.
10. CCCV charge was performed to 4.3 V at 0.2 C.
11. CC discharge was performed to 2.5 V at 0.2 C.
12. Steps 10 and 11 were repeated twice.

Note that the charging steps and the discharging steps such as Step 1, Step 4, and Steps 6 to 10 in the initial charge and discharge process were performed with the cell pressurized as in the case of Sample 12.

<Cycle Performance>

A cycle test was performed on each of Sample 12 and Sample 13 fabricated in the aforementioned manner. A cycle test process is as follows.

1. CCCV charge was performed to 4.3 V at 1 C.
2. CC discharge was performed to 2.5 V at 0.2 C.
3. The process in which CCCV charge is performed to 4.3 V at 1 C and then CC discharge is performed to 2.5 V at 1 C was repeated 50 times.
4. Steps 1 to 3 were repeated.

Note that the cell was not pressurized during the cycle test.

Figure 26A:
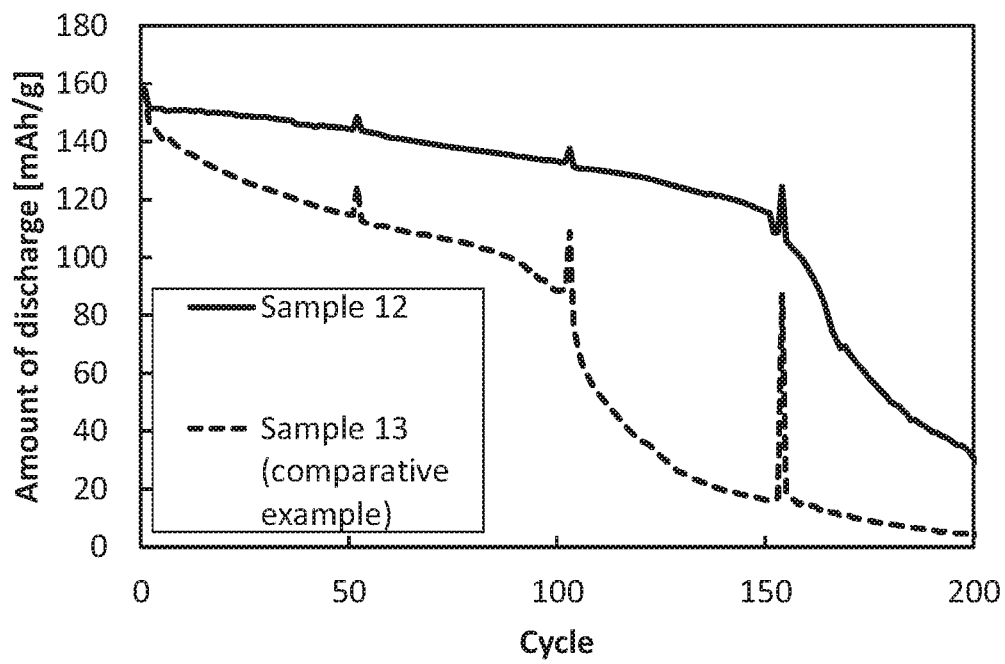
FIGS. 26A and 26B are graphs each showing the cycle performances of Sample 12 and Sample 13 in Example 7.
Figure 26B:
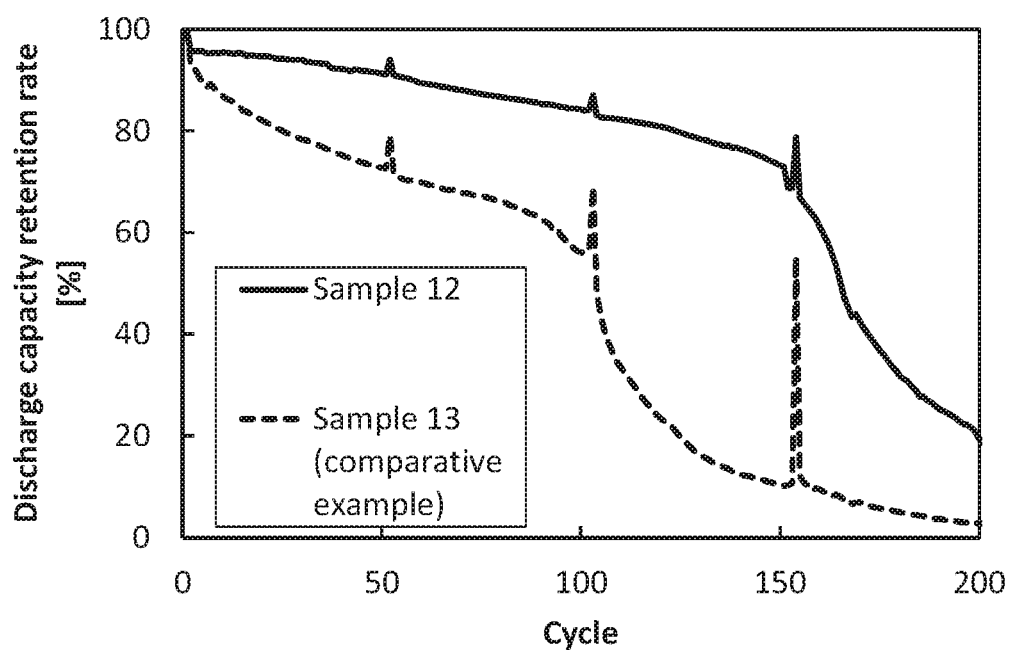

FIGS. 26A and 26B show cycle test results of Sample 12 and Sample 13. FIG. 26A is a graph showing discharge capacities, and FIG. 26B is a graph showing discharge capacity retention rates. In the graphs, the solid line represents Sample 12, and the broken line represents Sample 13. In the cycle test, discharge at 0.2 C was performed every time when 50 cycles of charge and discharge were performed at 1 C as described above: thus, discharge capacity increased after the cycle in which discharge at 0.2 C was performed.

As shown in FIGS. 26A and 26B, the cycle performance of Sample 12 is better than that of Sample 13.

The above results indicate that a lithium-ion secondary battery that can operate over a wide temperature range and has enhanced cycle performance can be fabricated in such a manner that an initial charge and discharge process is started with the EC content set to be high first, and after stable coating films are formed on surfaces of a positive electrode and a negative electrode, a different electrolytic solution is added to reduce the EC content.

This application is based on Japanese Patent Application serial No. 2016-095847 filed with Japan Patent Office on May 12, 2016 and Japanese Patent Application serial No. 2016-111877 filed with Japan Patent Office on Jun. 3, 2016, the entire contents of which are hereby incorporated by reference.

What is claimed is:

1. A method for manufacturing a power storage device, comprising:
    putting a positive electrode and a negative electrode in a container with an opening;
    injecting a first electrolytic solution containing an electrolyte, a first solvent, and a second solvent into the opening;
    sealing the opening and then performing charge under a first condition;
    mixing a third solvent into the first electrolytic solution;
    performing a first step of removing a gas from the container after mixing the third solvent into the first electrolytic solution;
    performing charge under a second condition;
    performing a keeping step;
    performing a second step of removing a gas from the container after performing the keeping step;
    performing charge under a third condition; and
    performing discharge and then repeating charge and discharge to obtain a power storage device containing a second electrolytic solution,
    wherein the first electrolytic solution contains the first solvent at more than 70 vol %,
    wherein the second electrolytic solution contains the first solvent at 60 vol % or less, and
    wherein the first solvent content in the first electrolytic solution is determined by analyzing a power storage device that is fabricated in advance using a deuterated product of the first solvent and a deuterated product of the second solvent and subjected to initial charge and discharge so as to deteriorate.

2. The method for manufacturing a power storage device, according to claim 1, wherein the second electrolytic solution contains the first solvent at more than 40 vol %.

3. The method for manufacturing a power storage device, according to claim 1, wherein the electrolyte is a lithium salt.

4. The method for manufacturing a power storage device, according to claim 1, further comprising:
    injecting vinylene carbonate into the first electrolytic solution after the first step of removing a gas from the container.

5. The method for manufacturing a power storage device, according to claim 1, wherein charge under the first condition, the second condition, or the third condition is performed with the container pressurized.

6. The method for manufacturing a power storage device, according to claim 5, wherein in the pressurization, higher pressure is applied to a region overlapping with the negative electrode and the positive electrode than to the other region.

7. The method for manufacturing a power storage device, according to claim 1, wherein the first solvent is ethylene carbonate.

8. The method for manufacturing a power storage device, according to claim 1, wherein the second solvent is diethyl carbonate.

9. The method for manufacturing a power storage device, according to claim 1, wherein the third solvent is ethyl methyl carbonate.

* * * * *